United States Patent
Eng et al.

(10) Patent No.: US 8,761,801 B2
(45) Date of Patent: Jun. 24, 2014

(54) METHOD AND SYSTEM FOR PROVIDING ONE OR MORE LOCATION-BASED SERVICES USING THE LOCATION-OF-INTEREST OF AN ELECTRONIC JOURNAL

(75) Inventors: Kai Eng, Atlantic Highlands, NJ (US); Pramod Pancha, Belle Mead, NJ (US)

(73) Assignee: Private Group Networks, Inc., Atlantic Highlands, NJ (US)

( * ) Notice: Subject to any disclaimer, the term of this patent is extended or adjusted under 35 U.S.C. 154(b) by 0 days.

(21) Appl. No.: 13/602,935

(22) Filed: Sep. 4, 2012

(65) Prior Publication Data

US 2014/0066099 A1    Mar. 6, 2014

(51) Int. Cl.
*H04W 24/00* (2009.01)

(52) U.S. Cl.
USPC ..................... 455/456.3; 340/539.1

(58) Field of Classification Search
USPC ............. 455/456.1–456.5; 340/539.1–539.13
See application file for complete search history.

(56) References Cited

U.S. PATENT DOCUMENTS

| | | | | |
|---|---|---|---|---|
| 8,385,944 B1 * | 2/2013 | Nelissen | ..................... | 455/456.3 |
| 8,416,073 B1 * | 4/2013 | Scofield et al. | .......... | 340/539.13 |
| 2002/0067308 A1 * | 6/2002 | Robertson | ................ | 342/357.17 |
| 2002/0198890 A1 * | 12/2002 | Jackson | ......................... | 707/101 |
| 2004/0180674 A1 * | 9/2004 | Blomqvist et al. | .......... | 455/456.5 |
| 2006/0058948 A1 * | 3/2006 | Blass et al. | ..................... | 701/207 |
| 2007/0241885 A1 * | 10/2007 | Clipsham | ................. | 340/539.13 |
| 2008/0065505 A1 * | 3/2008 | Plastina et al. | ................... | 705/26 |
| 2008/0304431 A1 * | 12/2008 | Karaoguz | ..................... | 370/310 |
| 2010/0004005 A1 * | 1/2010 | Pereira et al. | ................. | 455/457 |
| 2010/0004857 A1 * | 1/2010 | Pereira et al. | ................. | 701/209 |
| 2011/0057790 A1 * | 3/2011 | Martin et al. | ............ | 340/539.13 |
| 2013/0031169 A1 * | 1/2013 | Axelrod et al. | ............... | 709/204 |
| 2013/0203442 A1 * | 8/2013 | LeBlanc et al. | ............. | 455/456.3 |

\* cited by examiner

*Primary Examiner* — Nathan Taylor
(74) *Attorney, Agent, or Firm* — Kaplan, Breyer, Schwarz & Ottesen, LLP

(57) ABSTRACT

A method and system for providing one or more location-based services using the location-of-interest of a user or an electronic journal entry. In the first service, a user's terminal periodically determines whether its current geo-location is within a predefined distance of a location-of-interest. If the determination is in the affirmative, the user's terminal receives an audio recording from a data-processing system and plays it to the user as a reminder. In the second service, however, the user's terminal receives the audio recording from the data-processing system regardless of whether its current geo-location is or is not within a predefined distance of the location-of-interest. In contrast to the first service, the second service uses the virtual presence of a user to initiate the service, while first service uses the current geo-location of the user's terminal to initiate the service.

6 Claims, 17 Drawing Sheets

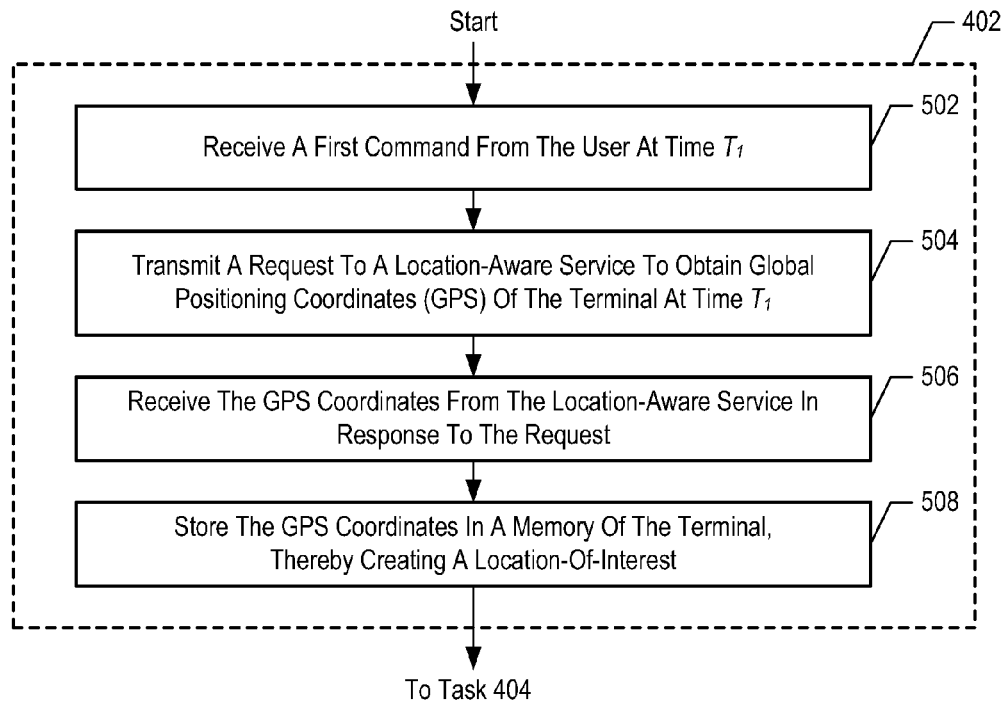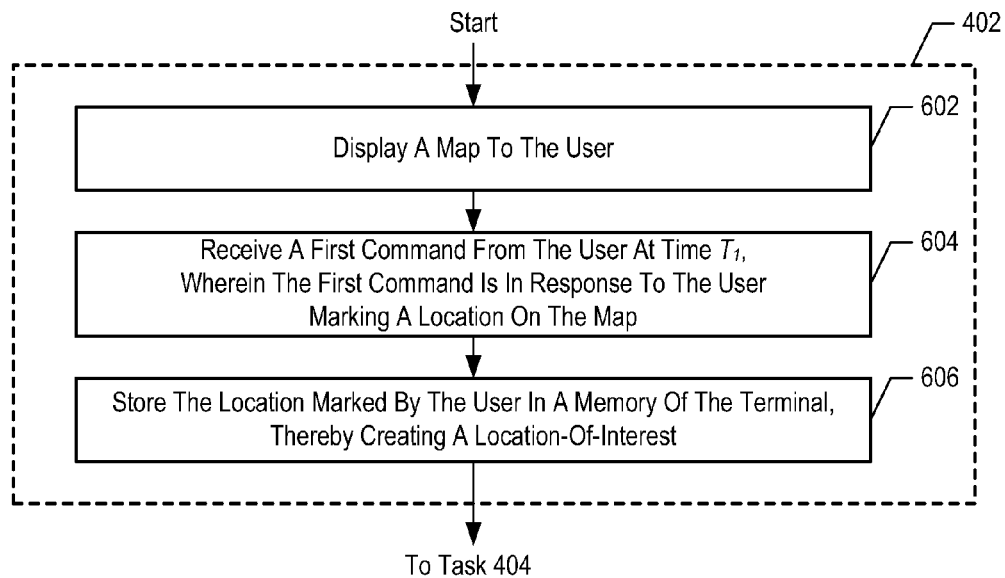

METHOD AND SYSTEM FOR PROVIDING ONE OR MORE LOCATION-BASED SERVICES USING THE LOCATION-OF-INTEREST OF AN ELECTRONIC JOURNAL

INCORPORATION BY REFERENCE

U.S. patent application Ser. No. 13/596,193, filed on Aug. 28, 2012, is incorporated herein by reference.

FIELD OF THE INVENTION

The present invention pertains to a method and system for providing one or more location-based services using the location-of-interest of an electronic journal.

BACKGROUND OF THE INVENTION

Electronic diaries in the prior art allow users to exploit the geo-location capabilities of their wireless phones to create a more compelling experience. The "check-in" feature provided by such electronic diaries is one example. This check-in feature allows a user to create an entry on his timeline-based, electronic diary with an indication that he is currently at an establishment of interest (e.g., a restaurant, a stadium, a supermarket, etc.). Once the user has updated his electronic diary with this indication, the user's friends, family members, co-workers, etc., can view the entry and post comments on the electronic diary about the establishment.

This check-in feature is advantageous because it allows a user to share information with other people that might be interested in his current geo-location. Conversely, this feature also allows the user who created the diary entry to receive information from other people about his current geo-location. Although there are many advantages in electronic diaries in the prior art, there are equally as many deficiencies or improvements that can be made to increase a user's experience.

As one example, electronic diaries in the prior art require a user and his phone to be physically at or near a location-of-interest to update the presence information on his electronic diary. As another example, electronic diaries in the prior art do not use the presence information of a user's electronic diary, in conjunction with the geo-location capabilities of his phone, to provide additional services, such as reminders.

SUMMARY OF THE INVENTION

The present invention cures the above deficiencies by providing a method and system for initiating one or more location-based services using the location-of-interest of an electronic journal.

According to one illustrative embodiment of the present invention, a user can create a location-of-interest using his terminal and assign a first service or a second service to that location-of-interest.

The first service is called, for example, "Return Services." In general, this service uses a terminal's current geo-location to retrieve an audio recording from a data-processing system when the terminal's current geo-location is within a predefined distance of a location-of-interest. More specifically, when a user arrives at a location-of-interest, the user can invoke a soft-button displayed on his terminal to obtain Global Positioning System (GPS) coordinates for his current geo-location. Once obtained, the user can subscribe the location-of-interest to "Return Services" and subsequently create an audio recording for that location. The location-of-interest, subscription, and audio recording are then transmitted from the terminal to a data-processing system where they are stored in a memory.

At a later time, the user's terminal automatically as well as periodically determines whether its current geo-location is within a predefined distance of the location-of-interest's GPS coordinates. If within the predefined distance, the user's terminal transmits a request to the data-processing system to retrieve the audio recording. Once received, the terminal plays the audio recording to the user, which serves as a reminder for the user to, for example, accomplish certain tasks when he is at or near the location-of-interest. If not within the predefined distance, the terminal performs the determination again at a later time (e.g., fifteen minutes later, thirty minutes later, etc.)

As described in more detail in this specification, other users can be notified by the data-processing system that the user has marked a location-of-interest. Other users can also be notified by the data-processing system of their permission to create an audio recording for that location-of-interest. Accordingly, the audio recording of the present invention is not limited to only being created by the user who subscribed to the service, but can also be created by those users who are given the proper authorization to do so.

The second service of the present invention is called, for example, "Continuous Services." In this service, a data-processing system uses a persistent, virtual presence of a user to periodically transmit an audio recording to the user's terminal. Similar to "Return Services," the audio recording for "Continuous Services" can be created by the user who subscribed to the service or by another user. In either case, the audio recording in "Continuous Services" is transmitted to the terminal regardless of whether or not its current geo-location is within a predefined distance of the location-of-interest. Because the virtual presence is "persistent," the user's terminal continues to receive the audio recording from the data-processing system until the he has unsubscribed the location-of-interest from the service.

These features of the present invention will be described in more detail below, with reference to the accompanying figures.

According to a second illustrative embodiment, the present invention uses the location-of-interest of a journal entry to provide additional services. More specifically, when a user arrives at a location or event deemed worthwhile to remember, the user can execute an application software on his terminal to display a button labeled, "pin," for example. The user simply makes a single tap, swipe, etc. of the button, and the application software will automatically obtain the current geo-location of the terminal as well as the date and time (i.e., calendrical time) of the "pin" command. The command will also activate an audio recorder of the user's terminal for a predefined time so that the user can record a word, a phrase, or a sentence about the location-of-interest. Once recorded, the user's terminal associates the current geo-location with the calendrical time and audio recording to form a single mnemonic record for that location-of-interest. If a photo of the location-of-interest is captured by the user, the terminal likewise associates the photo with the mnemonic record. The mnemonic is subsequently stored in a memory of the terminal such that the user can retrieve it at a later time.

Whenever the user has time to create a journal entry, which can be days, weeks, or months after creating the mnemonic, the user can execute the application software on his terminal to view a list of locations-of-interests that were pinned in the past. Each location-of-interest in the list is organized based on its respective geo-location. Each location-of-interest in the list is displayed with a mnemonic that comprises at least one of, or any combination of, calendrical time, audio recordings, photos, and videos. The user can select an audio recording of a particular mnemonic in the list to play the audio that was recorded at a location-of-interest. Similarly, the user can select a photo of a particular mnemonic to view the image that was captured at the location-of-interest. When the user recalls the details of the location-of-interest, the user launches a new screen on his terminal to create a journal entry based on the mnemonic.

In instances where the user would like to be reminded of something when he is at or near the location-of-interest, the user can subscribe the location-of-interest of the journal entry to "Return Services" or "Continuous Services." As part of subscribing to one of these services, the user is given the opportunity to create a reminder for himself in the form of an audio recording. In an alternative embodiment, the user can authorize other users to create the reminder. Once the journal entry is subscribed to one of these services, the terminal transmits, among other things, the journal entry, location-of-interest, and subscription to a data-processing system.

In this second embodiment, the present invention uses the location-of-interest of the journal entry, in conjunction with the current geo-location of the user's terminal, to initiate "Return Services" or "Continuous Services." For example, the user's terminal automatically and periodically determines whether its current geo-location is within a predefined distance of the location-of-interest of the journal entry. In an alternative embodiment, it is the data-processing system that performs the determination. In either case, if the current geo-location is determined to be within the predefined distance of the journal entry's location-of-interest, the terminal receives an audio recording and plays it to the user as a reminder.

These features of the present invention will likewise be described in more detail below, with reference to the accompanying figures.

BRIEF DESCRIPTION OF THE DRAWINGS

FIG. 5 depicts a flowchart of the operations of task 402 for marking a location-of-interest in accordance with an illustrative embodiment of the present invention.

FIG. 6 depicts a flowchart of the operations of task 402 for marking a location-of-interest in accordance with an alternative embodiment of the present invention.

DETAILED DESCRIPTION

For the purpose of this specification and the claims, the phrase "calendrical time" is defined as the date and time of when a terminal receives a command from a user.

Figure 1:
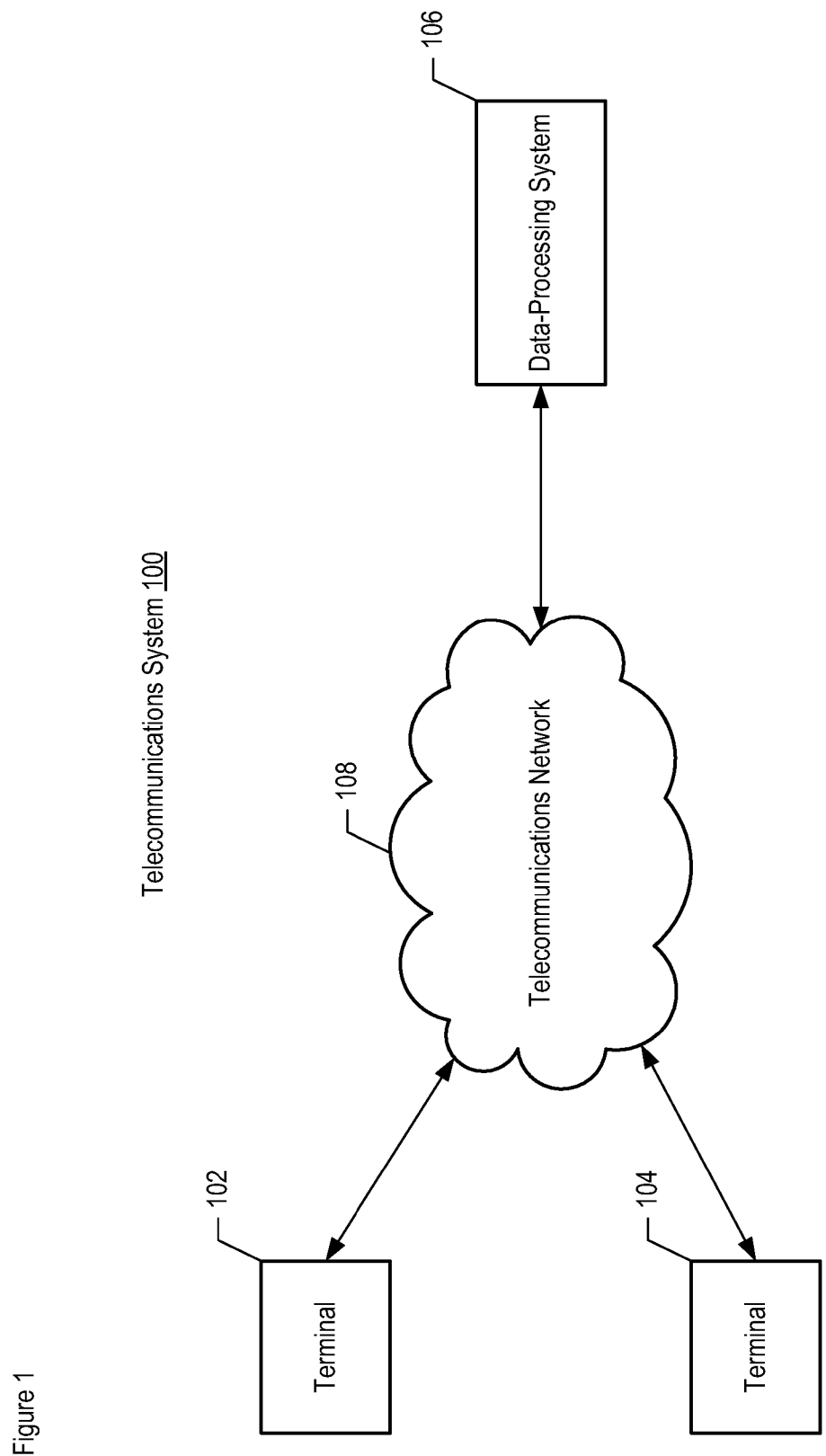
FIG. 1 depicts a diagram of some components of a telecommunications system according to an illustrative embodiment of the present invention.

FIG. 1 depicts a diagram of some components of telecommunications system 100 according to an illustrative embodiment of the present invention. Telecommunications system 100 comprises: telecommunications terminal 102; telecommunications terminal 104; data-processing system 106; and telecommunications network 108.

Although the illustrative embodiment comprises two telecommunications terminals, it will be clear to those skilled in the art, after reading this specification, how to make and use alternative embodiments of the present invention that comprises any number of telecommunications terminals.

According to the illustrative embodiment of the present invention, telecommunications terminal 102 is a wireless terminal that comprises the necessary hardware and software to perform the processes described below and in the accompanying figures. As will be clear to those skilled in the art, a wireless terminal is also known as a "cell phone," "smart phone," "mobile station," "car phone," "personal-digital-assistant (PDA)," and the like.

Terminal 102 is capable of communicating via one or more air-interface standards, such as Code Division Multiple Access (CDMA), Institute of Electrical and Electronics Engineers (IEEE) 802.11, Wi-Fi, WiMax, Bluetooth, etc. Terminal 102 is also capable of wirelessly transmitting and receiving electromagnetic signals to and from telecommunications network 108 via a wireless transceiver, in well-known fashion, and of estimating and reporting its geo-location. As will be appreciated by those skilled in the art, there are a variety of well-known techniques by which terminal 102 can determine its geo-location based on received electromagnetic signals, such as via a Global Positioning System (GPS) receiver, via triangulation, and so forth. It will be clear to those skilled in the art, after reading this specification, how to make and use alternative embodiments of the present invention in which the geo-location of terminal 102 is determined by an entity other than the terminal itself.

The software, hardware, and capabilities of telecommunications terminal 104 are substantially the same as terminal 102 discussed above. However, it will be clear to those skilled in the art, after reading this specification, how to make and use alternative embodiments of the present invention in which terminal 104 comprises all or some of the software, hardware, and capabilities of terminal 102.

Although the illustrative embodiment comprises one data-processing system, it will be clear to those skilled in the art, after reading this disclosure, how to make and use alternative embodiments of the present invention that comprises any number of data-processing systems. In the illustrative embodiment, data-processing system 106 is a server that comprises the necessary hardware and software to perform the processes described below and in the accompanying figures. In general, data-processing system 106 is capable of transmitting and receiving electromagnetic signals to and from terminals 102 and 104 via network 108, updating an electronic journal of a user, notifying other users of such updates, storing audio recordings received from one or more terminals, transmitting the audio recordings to one or more terminals, providing a service in response to a user's subscription, etc. It will be clear to those skilled in the art, after reading this specification, how to make and use alternative embodiments of the present invention in which data-processing system 106 is a network element that is other than a server.

Telecommunications network 108 is well-known in the art. In the illustrative embodiments, network 108 is the Internet. In other embodiments, network 108 is the Public Switched Telephone Network (PSTN), a private data network, etc. It will be clear to those skilled in the art, after reading this specification, how to make and use alternative embodiments of the present invention in which network 108 is one or more of the above-mentioned networks.

Figure 2:
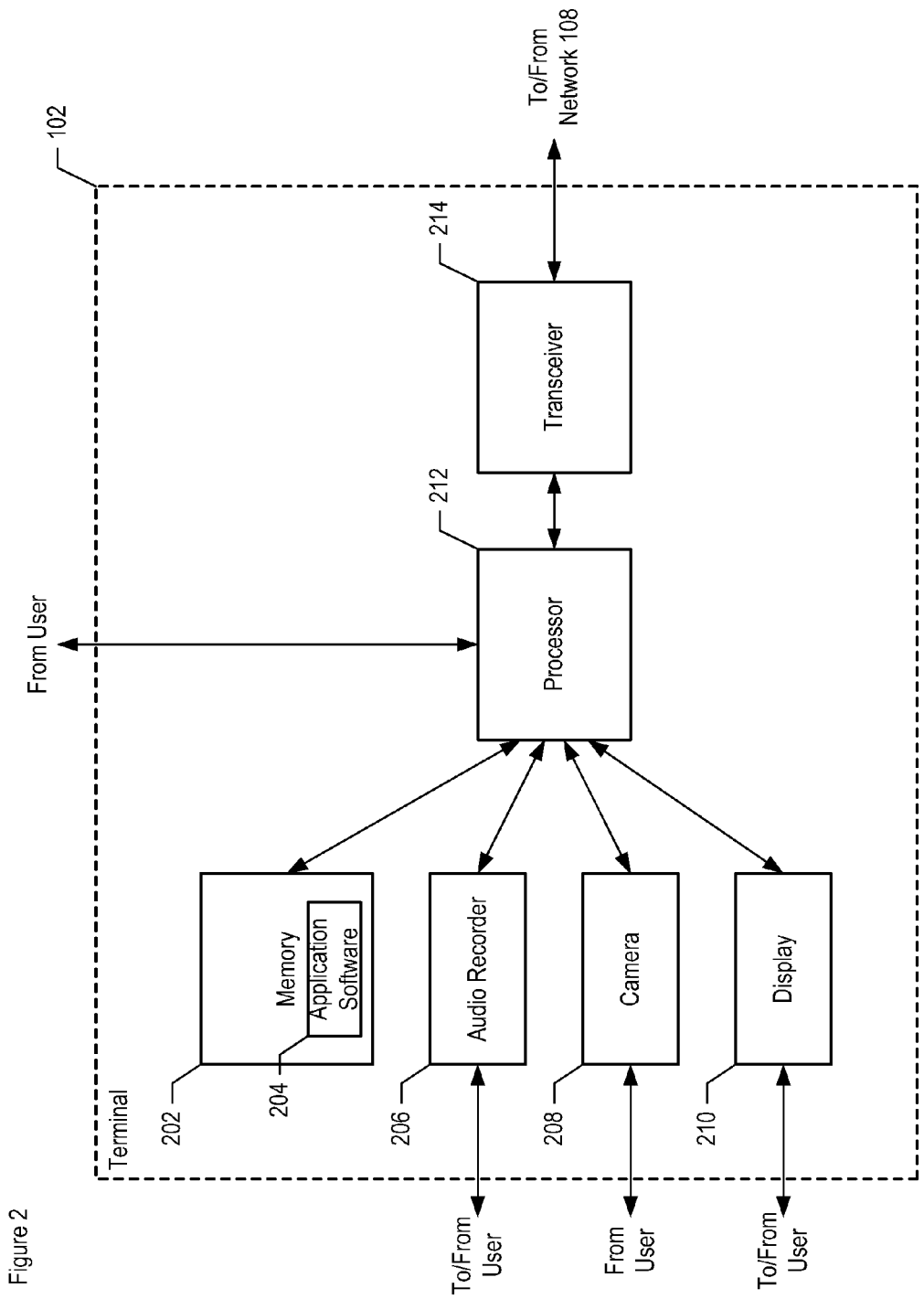
FIG. 2 depicts a block diagram of some elements of a telecommunications terminal according to an illustrative embodiment of the present invention.

FIG. 2 depicts a block diagram of some elements of telecommunications terminals 102 and 104 according to an illustrative embodiment of the present invention. As depicted in FIG. 2, terminals 102 and 104 comprise: memory 202; application software 204; audio recorder 206; camera 208; display 210; processor 212; and transceiver 214, interconnected as shown. FIG. 2 also depicts signals encoded with information that are transmitted to and received from telecommunications network 108.

Memory 202 stores data and executable instructions, as is well-known in the art. Memory 202 can be any combination of random-access memory (RAM), flash memory, disk drive, etc. It will be clear to those skilled in the art, after reading this specification, how to make and use memory 202.

As will be further discussed below, memory 202 stores application software 204 which, when executed by processor 212, enables a user to mark a locality (e.g., an establishment, a geo-graphic area, a neighborhood, etc.) as a location-of-interest, subscribe the location-of-interest to a first service or a second service, create an audio recording for the location-of-interest, etc. Application software 204 also enables a user to create and store one or more mnemonics for a location-of-interest and to create a journal entry based on the one or more mnemonics. Application software 204 will be described in more detail below, with reference to the accompanying figures.

Audio recorder 206 is capable of recording a word, a phrase, a sentence, background noise, etc. In general, audio recorder 206 can be automatically or manually activated by the user to create an audio recording for a location-of-interest. As will be discussed, the audio recording can be used as a mnemonic for creating a journal entry or a reminder for the user to accomplish certain task while at or near a location-of-interest.

Camera 208 is capable of capturing both photos and videos, as is well-known in the art. Camera 208 enables a user to capture photos and videos at a location-of-interest, and store them in memory 202 to create a mnemonic.

Display 210 is a touch-sensitive display that is capable of receiving input from the user and of transmitting signals representing the input to processor 212 for processing. Display 210 is also capable of displaying text, photos, videos, maps, etc., to the user.

Processor 212 is a general-purpose processor that is capable of executing application software 204 and the instructions stored in memory 202 for performing the processes described below and in the accompanying figures. In some alternative embodiments of the present invention, processor 212 is a special-purpose processor. The processes performed by processor 212 in accordance with the illustrative method will be described in more detail below, with reference to the accompanying figures.

Transceiver 214 comprises a receiving part and a transmitting part. The receiving part receives signals from network 108, and forwards the information encoded in the signals to processor 212 for processing. The transmitting part, on the other hand, receives information from processor 212 and outputs signals encoded with information to network 108. It will be clear to those skilled in the art, after reading this specification, how to make and use transceiver 214.

Figure 3:
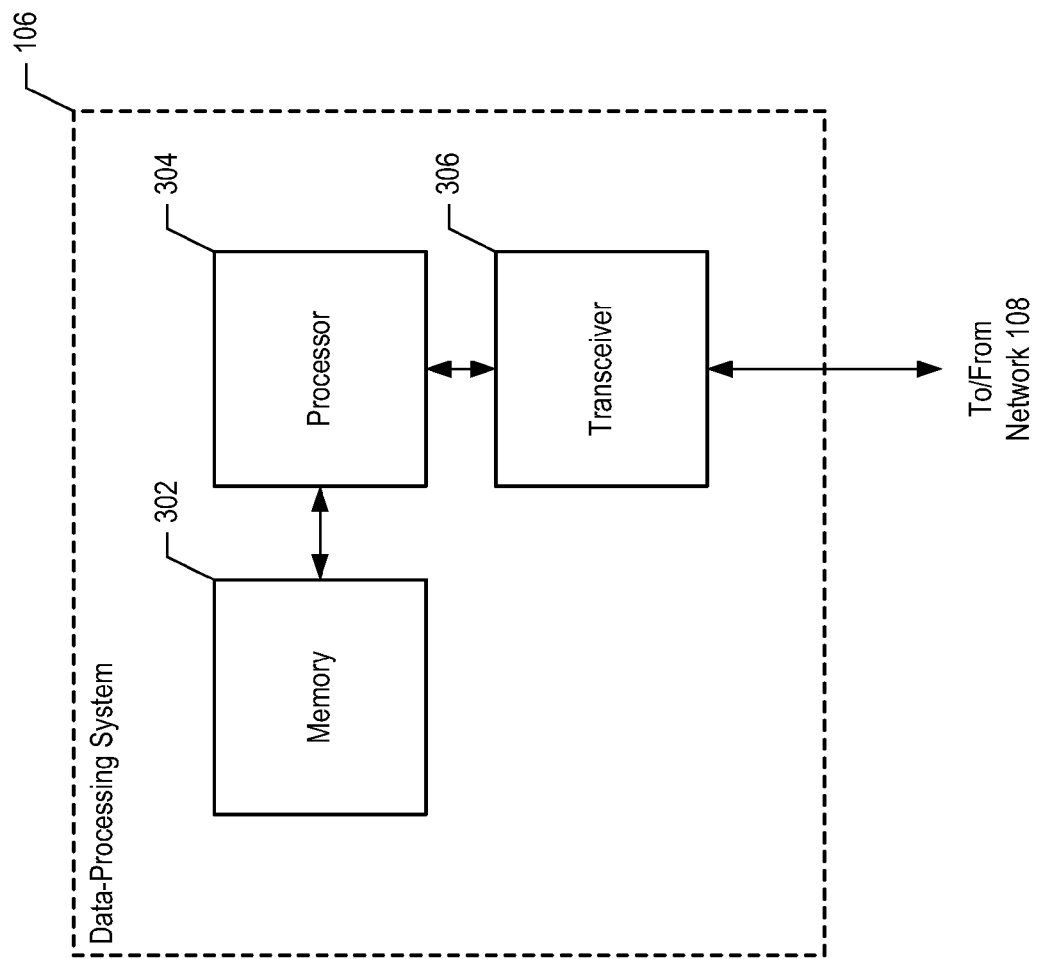
FIG. 3 depicts a block diagram of some elements of a data-processing system according to an illustrative embodiment of the present invention.

FIG. 3 depicts a block diagram of some elements of data-processing system 106 according to an illustrative embodiment of the present invention. As depicted in FIG. 3, data-processing system 106 comprises: memory 302; processor 304; and transceiver 306, interconnected as shown. FIG. 3 also depicts signals encoded with information that are transmitted to and received from telecommunications network 108.

Memory 302 stores data and executable instructions, as is well-known in the art. Memory 302 can be any combination of random-access memory (RAM), flash memory, disk drive, etc. It will be clear to those skilled in the art, after reading this specification, how to make and use memory 302. As will be further discussed below, memory 302 stores executable instructions for performing the processes described below, with reference to the accompanying figures. In general, memory 302 stores audio recordings created for one or more locations-of-interests, advertisements created by a third-party entity for a particular location-of-interest, electronic journals of users, etc. It will be clear to those skilled in the art, after reading this specification, how to make and use memory 302.

Processor 304 is a general-purpose processor that is capable of executing the instructions stored in memory 302 for performing the processes described below and in the accompanying figure. In general, processor 304 is capable of executing the encoded signals received via telecommunications network 108, reading data from and writing data into memory 302, transmitting audio recordings and advertisements stored in memory 302 to one or more terminals, updating a user's electronic journal in response to receiving a command, notifying other user's of the update, determining whether a terminal's current geo-location is within a predefined distance of a location-of-interest, etc. In some alternative embodiments of the present invention, processor 304 is a special-purpose processor. It will be clear to those skilled in the art, after reading this specification, how to make and use processor 304.

Transceiver 306 comprises a receiving part and a transmitting part. The receiving part receives signals from network 108, and forwards the information encoded in the signals to processor 304 for processing. The transmitting part, on the other hand, receives information from processor 304, and outputs signals encoded with information to network 108. It will be clear to those skilled in the art, after reading this specification, how to make and use transceiver 306.

Figure 4:
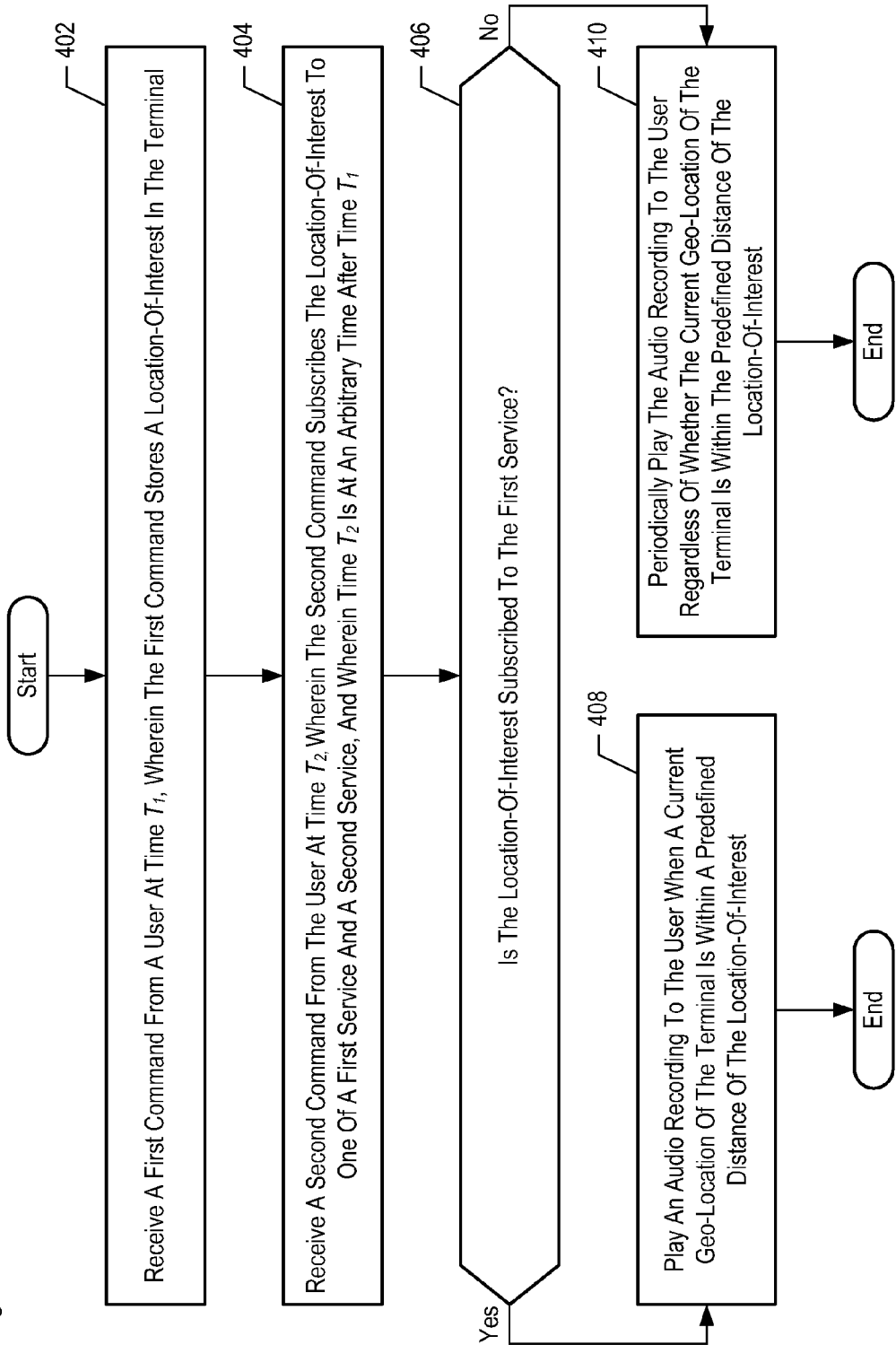
FIG. 4 depicts a flowchart of the operations in accordance with an illustrative embodiment of the present invention.

FIG. 4 depicts a flowchart of the operations in accordance with an illustrative embodiment of the present invention. FIG. 4 comprises: tasks 402, 404, 406, 408, and 410. It will be clear to those skilled in the art, after reading this specification, how to make and use alternative embodiments of the present invention in which tasks 402 through 410 can be performed concurrently, simultaneously, at different times, or in a different order.

According to the present invention, a user can mark a locality (e.g., an establishment, geo-graphic area, neighborhood, etc.) as a location-of-interest in two ways. The first method is by using telecommunications terminal 102's current geo-location as the location-of-interest. The second method is by marking an area on a map displayed by terminal 102 as the location-of-interest.

As an example of the first method, a user of terminal 102 arrives at a location-of-interest at task 402. While physically at this location, the user executes application software 204 on terminal 102. In response to executing the application software, terminal 102 displays a soft-button labeled "mark," for example, to the user on display 210. At time T$_1$, and while physically at this location, the user invokes the "mark" button by performing, for example, and without limitation, a single tap or swipe of the button. This single tap of the button represents a first command for terminal 102 to use its current geo-location as the location-of-interest.

As an example of the second method, the user can execute application software 204 on terminal 102 to display a map. Once displayed, the user can mark a particular location on the map to create a persistent, virtual presence at that location. In this second method, the user does not need to be physically at the location to mark it as a location-of-interest. Task 402 will be described in more detail below, with reference to FIG. 5 through FIG. 7.

At task 404, terminal 102 receives a second command from the user at time T$_2$, wherein time T$_2$ can be one or more minutes, hours, days, weeks, or months after the first command at time T$_1$. The second command provided by the user via application software 204 subscribes the location-of-interest to a first service (i.e., "Return Services") or a second service (i.e., "Continuous Services"). Once the user has subscribed to one of these services, terminal 102 associates the subscription with the location-of-interest and stores the association in memory 202. Task 404 will be described in more detail below, with reference to FIG. 8.

At task 406, terminal 102 determines whether the user subscribed the location-of-interest to the first service. If the user subscribed the location-of-interest to the first service, the illustrative embodiment proceeds to task 408, otherwise the illustrative embodiment proceeds to task 410.

At task 408, terminal 102 determines whether its current geo-location is within a predefined distance of the location-of-interest. If the determination is in the affirmative, terminal 102 retrieves an audio recording from data-processing system 106 and plays the audio recording to the user. If not within the predefined distance, terminal 102 performs the determination at a later time until the determination is in the affirmative or until the user unsubscribes to the first service. Task 408 will be described in more detail below, with reference to FIG. 9.

At task 410, data-processing system 106 periodically transmits the audio recording to terminal 102 regardless of whether its current geo-location is within a predefined distance of the location-of-interest. In this service, terminal 102 continues to periodically receive the audio recording from data-processing system 106 because the user established a persistent, virtual presence at that location. To stop data-processing system 106 from continuously transmitting the audio recording, the user can unsubscribe to the second service by, for example, and without limitation, unmarking his virtual presence on a map displayed by terminal 102. Task 410 will be described in more detail below, with reference to FIG. 10.

FIG. 5 depicts a flowchart of the operations of task 402 for marking a location-of-interest in accordance with an illustrative embodiment of the present invention. FIG. 5 comprises: tasks 502, 504, 506, and 508. It will be clear to those skilled in the art, after reading this specification, how to make and use alternative embodiments of the present invention in which at least some of tasks 502 through 508 are performed concurrently, simultaneously, at different times, or in a different order.

At task 502, terminal 102 receives a first command from the user at time T$_1$ via application software 204. At task 504, terminal 102 transmits a request to a location-aware service to obtain Global Positioning (GPS) coordinates for terminal 102's current geo-location. In the illustrative embodiment, terminal 102 obtains the GPS coordinate by transmitting a request to a remote location-aware service. This remote location-aware service can be, for example, and without limitation, data-processing system 106, a different server, a base station of a cell-tower, etc. In other embodiments, terminal 102 determines its own geo-location based on received electromagnetic signals, such as via a GPS receiver, via triangulation, and so forth. At task 506, terminal 102 receives the GPS coordinates from the location-aware service in response to the request. At task 508, terminal 102 stores the GPS coordinates in memory 202, thereby creating a location-of-interest at time T$_1$. Once the location-of-interest is created and stored in memory 202, the illustrative embodiment proceeds to task 404 of FIG. 4, where the user subscribes the location-of-interest to a first service or a second service.

FIG. 6 depicts a flowchart of the operations of task 402 for marking a location-of-interest in accordance with an alternative embodiment of the present invention. FIG. 6 comprises: tasks 602, 604, and 606. It will be clear to those skilled in the art, after reading this specification, how to make and use alternative embodiments of the present invention in which at least some of tasks 602 through 606 are performed concurrently, simultaneously, at different times, or in a different order.

In this alternative embodiment, the user executes application software 204 on terminal 102 and invokes a soft-button labeled, for example, "map." In response, terminal 102 displays a map to the user at task 602. Once the map is displayed, the user can enter the name, city, state, zip code, longitude and latitude, neighborhood, etc., of a location-of-interest into a search engine. By entering this information into the search engine, the map displays a geo-graphic area of where the location-of-interest can be generally found on the map. The user can zoom-in and zoom-out of the map to pinpoint find the location-of-interest.

Once the user is able to pinpoint the location-of-interest on the map, terminal 102 receives a first command from the user at task 604. This command is in response to the user tapping on display 210 at time $T_1$ to mark the location-of-interest on the map. By marking the location-of-interest in this way, a persistent, virtual presence of the user is created at that location.

At task 606, terminal 102 stores the location in memory 202 as the location-of-interest and the illustrative embodiment proceeds to task 404 of FIG. 4, where the user subscribes the location-of-interest to a first service or a second service.

It will be clear to those skilled in the art, after reading this specification, how to make and use alternative embodiments of the present invention in which the map can be any one of, or any combination of, a political map, a physical map, a topographical map, a road map, a satellite map, a street map, etc.

Figure 7:
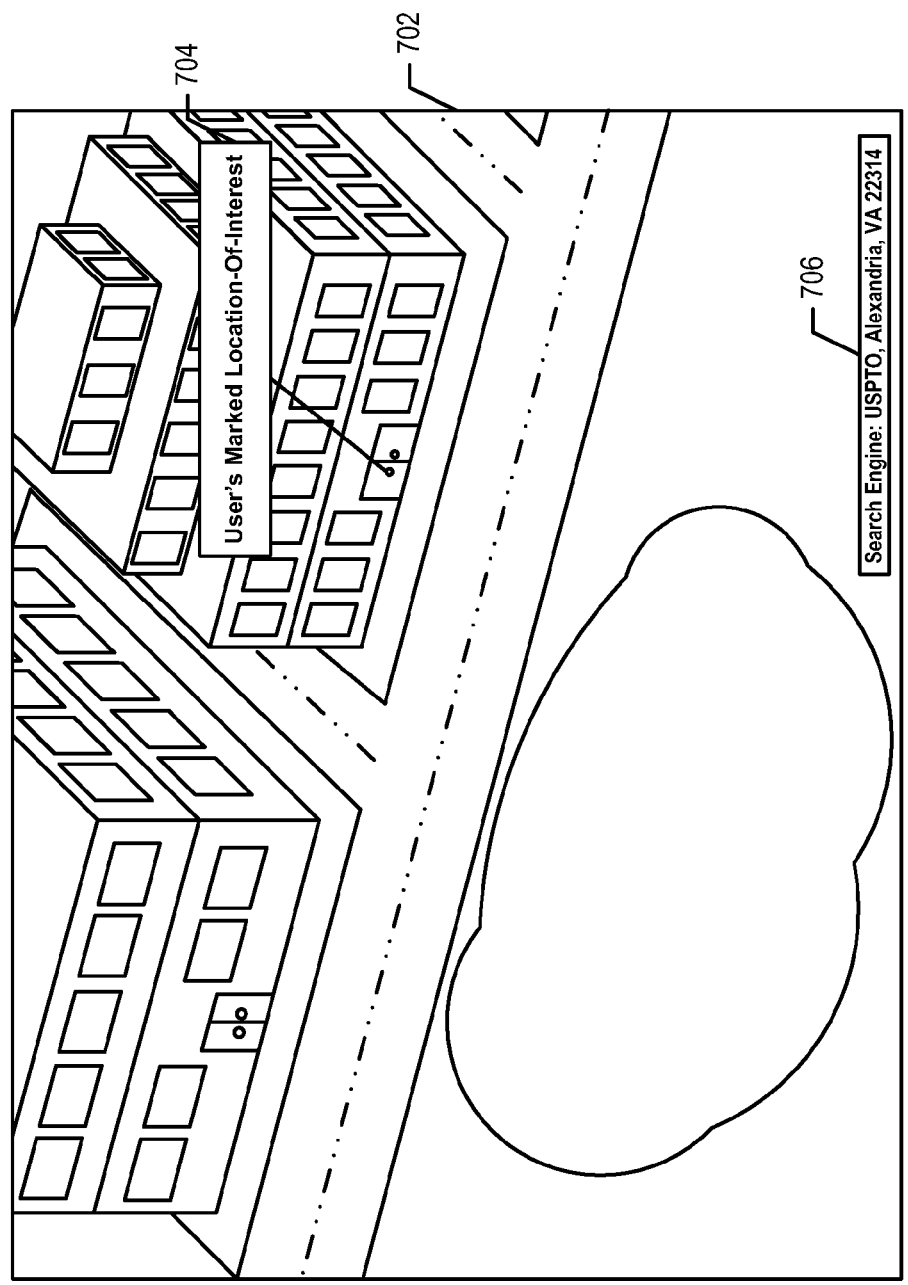
FIG. 7 depicts a map that comprises a location-of-interest marked by a user to create a virtual presence in accordance with an alternative embodiment of the present invention.

FIG. 7 depicts a map that comprises a location-of-interest marked by a user to create a persistent, virtual presence in accordance with an alternative embodiment of the present invention. FIG. 7 comprises: map 702, a user's virtual presence at a location-of-interest 704, and search engine 706.

As discussed above, the user executes application software 204 on terminal 102 and invokes a "map" button on display 210. In response, terminal 102 displays map 702 to the user, which comprises search engine 706. The user can enter the name, city, state, zip code, longitude and latitude, neighborhood, etc., of a location-of-interest into search engine 706 to display a geo-graphic area of where it can be generally found on map 702. Once the user is able to pinpoint the location-of-interest on map 702, the user can create a persistent, virtual presence at that location by tapping on display 210. Alternatively, the user can drag-and-drop an icon onto the location-of-interest on map 702 to create the virtual presence. In response to the user marking the location-of-interest on map 702, terminal 102 stores the location in memory 202.

Figure 8:
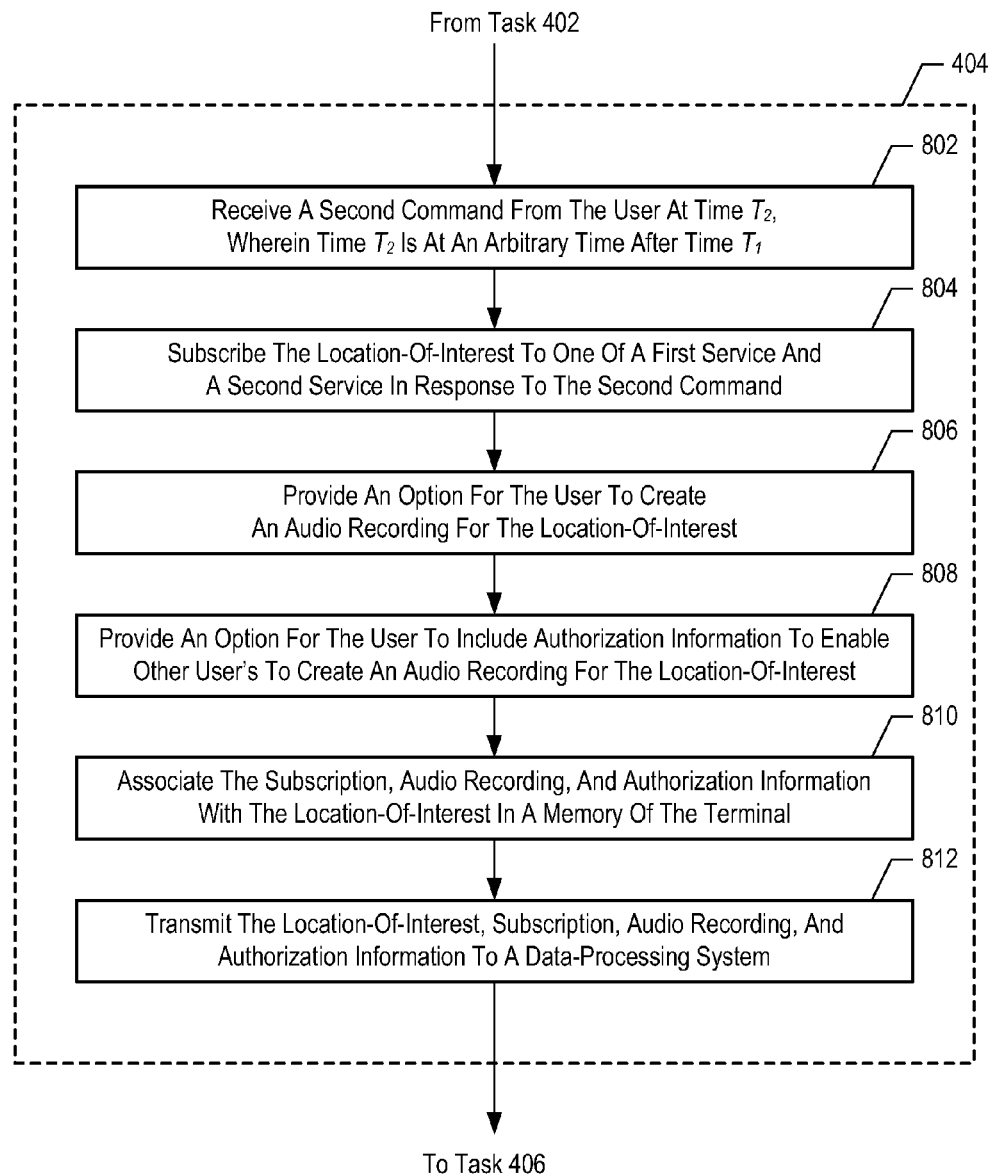
FIG. 8 depicts a flowchart of the operations of task 404 for subscribing to a service in accordance with an illustrative embodiment of the present invention.

FIG. 8 depicts a flowchart of the operations of task 404 for subscribing to a service in accordance with an illustrative embodiment of the present invention. FIG. 8 comprises: tasks 802, 804, 806, 808, 810, and 812. It will be clear to those skilled in the art, after reading this specification, how to make and use alternative embodiments of the present invention in which at least some of tasks 802 through 812 are performed concurrently, simultaneously, at different times, or in a different order.

For the purpose of describing FIG. 8, the first service will be called "Return Services" and the second service will be called "Continuous Services."

At task 802, terminal 102 receives a second command from the user at time $T_2$ via application software 204, wherein time $T_2$ can be one or more minutes, hours, days, weeks, or months after the first command at time $T_1$. As an example, the user can mark a location-of-interest and immediately subscribe that location-of-interest to "Return Services" or "Continuous Services" via application software 204. Alternatively, the user can retrieve a list of locations-of-interests that were marked by the user a month ago and subscribe a particular location in the list to "Return Services" or "Continuous Services."

At task 804, terminal 102 subscribes the location-of-interest to "Return Services" or "Continuous Services" in response to receiving the second command at time $T_2$. Once the user has subscribed the location-of-interest to one of these services, the subscription is stored in memory 202 of terminal 102.

According to the illustrative embodiment, "Return Services" automatically retrieves an audio recording from data-processing system 106 when the user and terminal 102 are within a predefined distance of the location-of-interest. In other words, application software 204 uses terminal 102's current geo-location to initiate "Return Services" to retrieve an audio recording from data-processing system 106.

"Continuous Services," on the other hand, uses the virtual presence of a user to cause data-processing system 106 to automatically and periodically transmit an audio recording to terminal 102. "Continuous Services" is different than "Return Services" in that it uses the virtual presence of a user to initiate the service, while "Return Services" uses the terminal's current geo-location to initiate the service.

At task 806, application software 204 executed by terminal 102 provides an option for the user to create an audio recording for the location-of-interest. The audio recording serves as a reminder for the user to perform certain tasks the next time he returns to or is near the location-of-interest. If the user chooses to create an audio recording, the user can speak into audio recorder 206 to record a word, a phrase, a sentence, etc. Once created, terminal 102 stores the audio recording in memory 202 and the illustrative embodiment proceeds to task 808. Alternatively, the user can choose not to create an audio recording by invoking a soft-button of terminal 102 to disable audio recorder 206. In either case, the illustrative embodiment proceeds to task 808 after the user is given the opportunity to create an audio recording.

At task 808, terminal 102 provides an option for the user to include authorization information for the location-of-interest. The authorization information enables other users to create an audio recording for the location-of-interest. If the user who subscribed to the service chooses to allow, for example, his friends, family members, co-workers, etc., to create an audio recording, the user can select these authorized users from a "buddy list." Once selected, terminal 102 stores the authorization information in memory 202, and the illustrative embodiment proceeds to task 810. Alternatively, the user can choose not to allow other users to create an audio recording for the location-of-interest, in which case, the illustrative embodiment proceeds to task 810.

At task 810, terminal 102 associates the subscription with the location-of-interest and stores the association in memory 202. If an audio recording was created by the user at task 806, or if authorization information was provided by the user at task 808, terminal 102 likewise associates this information with the location-of-interest and the subscription in memory 202.

At task 812, terminal 102 transmits the location-of-interest and the subscription to data-processing system 106 for storage in memory 302. If the user created an audio recording or provided authorization information, this data is also transmitted to data-processing system 106 for storage. In accordance with the illustrative embodiment, data-processing system 106 receives the authorization information from terminal 102 and notifies other users of the location-of-interest, as well as their permission to create an audio recording for that location. In response to the notification, these users can choose to create and transmit an audio recording to data-processing system 106 for storage in memory 302.

Once the above tasks have been performed by terminal 102, the illustrative embodiment proceeds to task 406 to determine which service to initiate for the location-of-interest.

Figure 9:
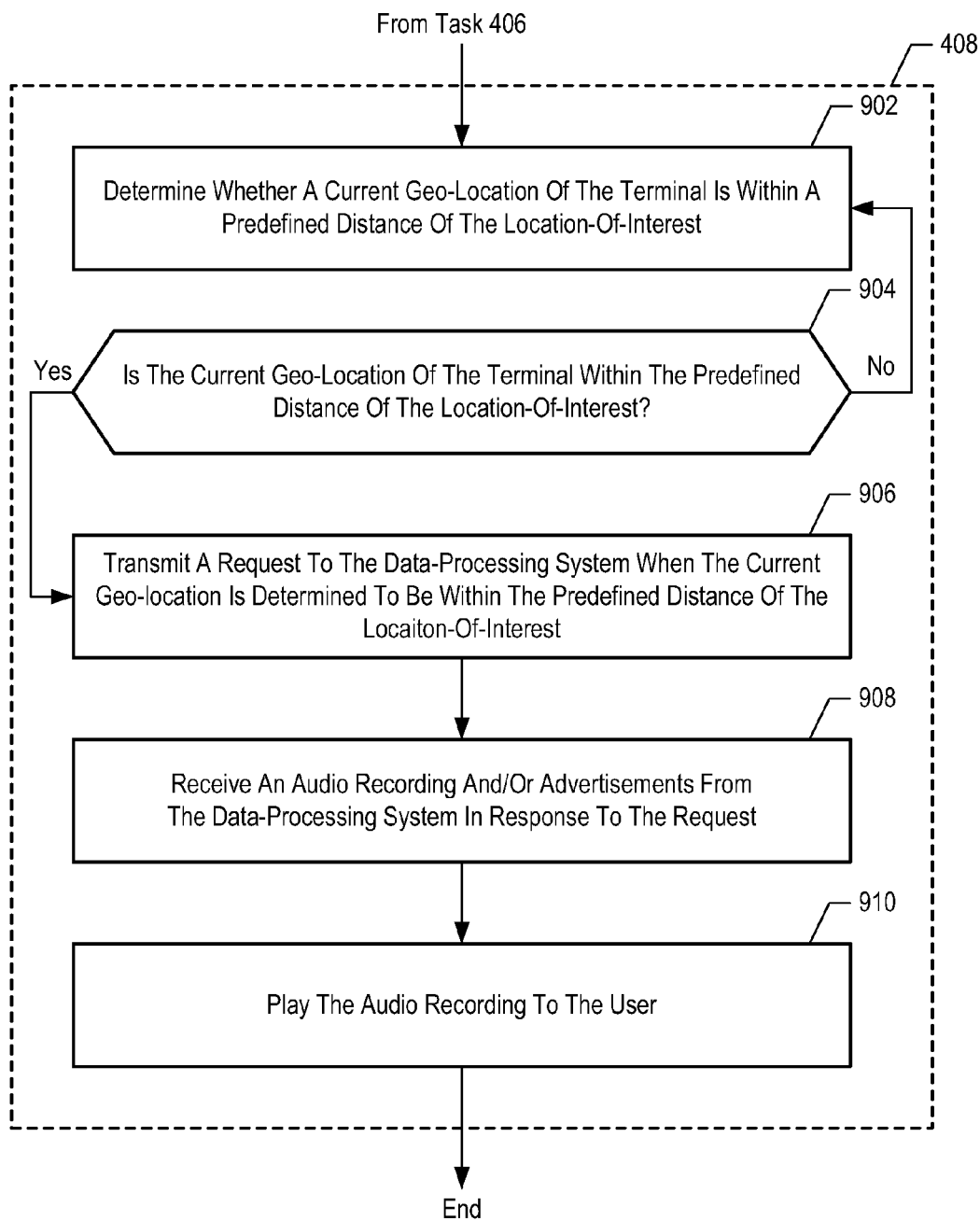
FIG. 9 depicts a flowchart of the operations of task 408 for initiating the first service by a terminal in accordance with an illustrative embodiment of the present invention.

FIG. 9 depicts a flowchart of the operations of task 408 for initiating a first service in accordance with an illustrative embodiment of the present invention. FIG. 9 comprises: tasks 902, 904, 906, 908, and 910. It will be clear to those skilled in the art, after reading this specification, how to make and use alternative embodiments of the present invention in which at least some of tasks 902 through 910 are performed concurrently, simultaneously, at different times, or in a different order.

For the purpose of describing FIG. 9, the first service will be called "Return Services" and the second service will be called "Continuous Services." In order to initiate one of these services, terminal 102 needs to determine whether the location-of-interest is subscribed to "Return Services" or "Continuous Services." Since the subscription for the location-of-interest is stored in memory 202 at task 804, terminal 102 can retrieve the subscription from memory 202, analyze it, and determine that the location-of-interest is subscribed to "Return Services." Based on this determination, terminal 102 initiates "Return Services," as described below.

At task 902, terminal 102 determines whether its current geo-location is within a predefined distance of the Global Positioning System (GPS) coordinates of the location-of-interest obtained at task 506.

At task 904, if the current geo-location is determined by terminal 102 to be within a predefined distance of the GPS coordinates, the illustrative embodiment proceeds to task 906 to retrieve an audio recording from data-processing system 106. For example, and without limitation, if terminal 102 determines that its current geo-location is within one hundred yards of the location-of-interest's GPS coordinates, the illustrative embodiment proceeds to task 906 to retrieve an audio recording from data-processing system 106. In accordance with the illustrative embodiment, the predefined distance can be pre-programmed into application software 204 or defined by the user via terminal 102.

On the other hand, if the current geo-location of terminal 102 is determined not to be within the predefined distance of the GPS coordinates, the illustrative embodiment returns to task 902 to repeat the determination at a later time. For example, if terminal 102 determines that its current geo-location is not within one hundred yards of the location-of-interest's GPS coordinates, the illustrative embodiment returns to task 902 such that the determination is performed fifteen minutes later. In accordance with the illustrative embodiment, the time in which terminal 102 repeats tasks 902 and 904 can be pre-programmed into application software 204 or defined by the user via terminal 102.

At task 906, terminal 102 transmits a request to data-processing system 106 to retrieve the audio recording in response to determining that its current geo-location is within a predefined distance of the location-of-interest's GPS coordinates.

At task 908, terminal 102 receives the audio recording from data-processing system 106 in response the request. In the illustrative embodiment, the audio recording received by terminal 102 is created by the user who subscribed to "Return Services" (i.e., at task 806 of FIG. 8). In other embodiments, the audio recording is created by other users that are authorized to create the audio recording.

It will be clear to those skilled in the art, after reading this specification, how to make and use alternative embodiments of the present invention in which terminal 102 receives both a first audio recording and a second audio recording for the location-of-interest. In this alternative embodiment, the first audio recording is created by the user who subscribed to "Return services," while the second audio recording is created by an authorized user.

In addition to receiving the audio recording, terminal 102 also receives advertisements from data-processing system 106. These advertisements are created by third party entities and stored in memory 302 of data-processing system 106. More specifically, the third party entities assign a particular locality for the advertisements such that they can be appropriately distributed by data-processing system 106. For example, an entity creates an advertisement and assigns a particular locality to the advertisement. The advertisement and its intended locality are transmitted to data-processing system 106 for storage in memory 302. When data-processing system 106 receives a request from terminal 102 to retrieve an audio recording for a location-of-interest, data-processing system 106 searches memory 302 to determine whether the locality of any advertisements matches the location-of-interest of that audio recording. If data-processing system 106 determines that there is a match, the advertisement is transmitted to terminal 102 along with the audio recording.

At task 910, terminal 102 plays the audio recording to the user via audio recorder 206. Alternatively, terminal 102 also displays the advertisement to the user on display 210. Once terminal 102 plays the audio recording and/or displays the advertisement to the user, the location-of-interest automatically unsubscribes to "Return Services." Alternatively, terminal 102 continues to receive the audio recording from data-processing system 106 until the user unsubscribes to "Return Services."

Figure 10:
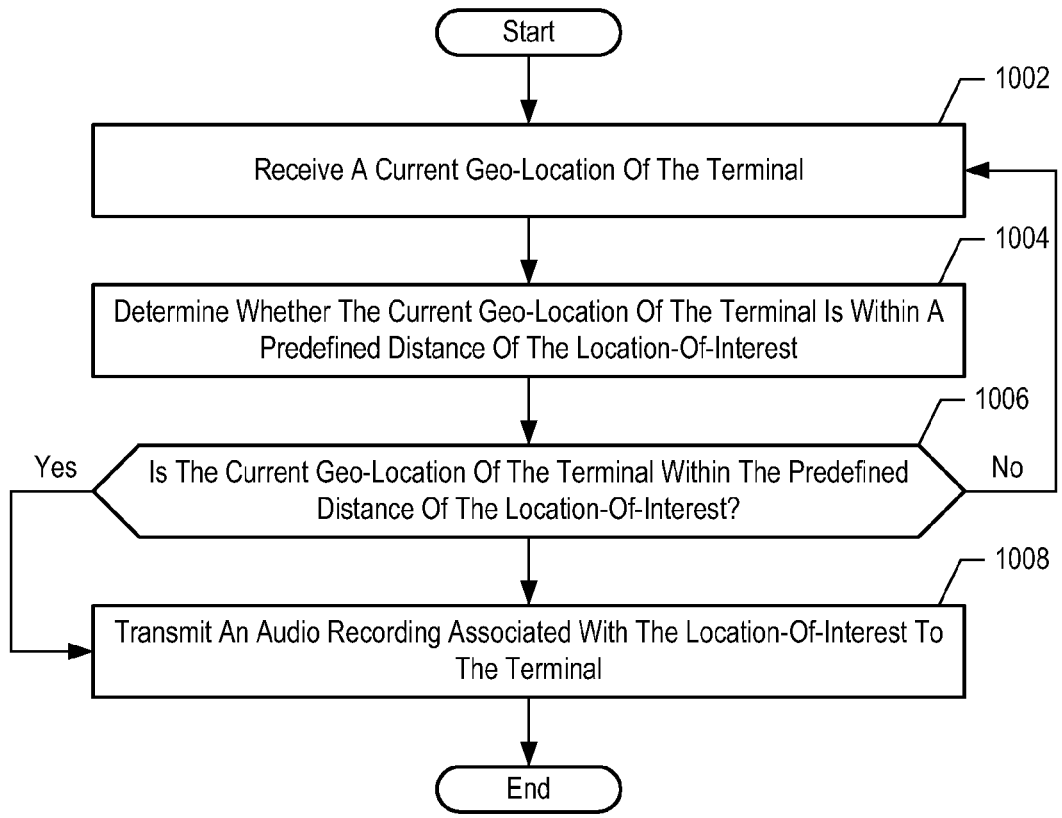
FIG. 10 depicts a flowchart of the operations of task 408 for initiating the first service by a data-processing system in accordance with an illustrative embodiment of the present invention.

FIG. 10 depicts a flowchart of the operations for initiating a "Return Services" in accordance with an alternative embodiment of the present invention. FIG. 10 comprises: tasks 1002, 1004, 1006, and 1008. It will be clear to those skilled in the art, after reading this specification, how to make and use alternative embodiments of the present invention in which at least some of tasks 1002 through 1008 can be performed concurrently, simultaneously, at different times, or in a different order.

In this alternative embodiment of the present invention, it is data-processing system 106 that initiates "Return Services," rather than terminal 102. As discussed above, with reference to FIG. 8, terminal 102 transmits the location-of-interest to data-processing system 106 at task 8012.

At a later time, which can be days, weeks, or months later, data-processing system 106 receives terminal 102's current geo-location at task 1002. At task 1004, data-processing system 106 determines if the terminal's current geo-location is within a predefined distance of the location-of-interest's GPS coordinates. At task 1006, if data-processing system 106 determines that the terminal's current geo-location is within the predefined distance, the present invention proceeds to task 1008, where an audio recording is transmitted to terminal 102. On the other hand, if data-processing system 106 determines that the terminal's current geo-location is not within the predefined distance, the present invention returns to task 1002, where data-processing system 106 waits for terminal 102 to transmit its next current geo-location. At task 1008, data-processing system 106 retrieves an audio recording from memory 302 and transmits it to terminal 102 via telecommunications network 108.

Figure 11:
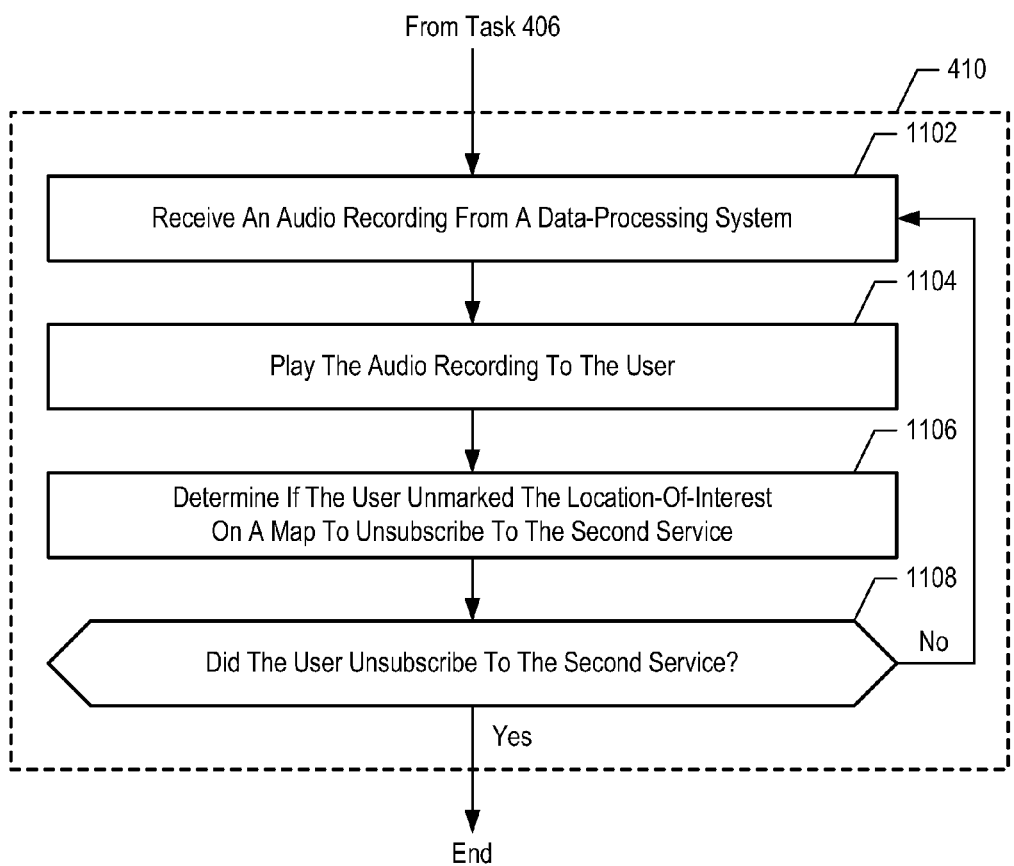
FIG. 11 depicts a flowchart of the operations of task 410 for initiating the second service in accordance with an illustrative embodiment of the present invention.

FIG. 11 depicts a flowchart of the operations of task 410 for initiating a second service in accordance with an illustrative embodiment of the present invention. FIG. 11 comprises: tasks 1102, 1104, 1106, and 1108. It will be clear to those skilled in the art, after reading this specification, how to make and use alternative embodiments of the present invention in which at least some of tasks 1102 through 1108 can be performed concurrently, simultaneously, at different times, or in a different order.

For the purpose of describing FIG. 11, the first service will be called "Return Services" and the second service will be called "Continuous Services." The flowchart of FIG. 11 corresponds to the user subscribing the location-of-interest to "Continuous Services." In this service, data-processing system 106 automatically as well as periodically transmits an audio recording to terminal 102, regardless of whether or not its current geo-location is within a predefined distance of the location-of-interest's GPS coordinates.

In order to initiate this service, data-processing system 106 needs to determine whether the location-of-interest is subscribed to "Return Services" or "Continuous Services." Since the subscription was transmitted by terminal 102 to data-processing system 106 at task 812, the data-processing system can retrieve the information from memory 302, analyze it, and determine that the location-of-interest is subscribed to "Continuous Services." Based on this determination, data-processing system initiates "Continuous Services," as described below.

At task 1102, data-processing system 106 transmits an audio recording to terminal 102 via telecommunications network 108. Data-processing system 106 transmits the audio recording in response to the user's persistent, virtual presence at the location-of-interest. Terminal 102 receives the audio recording associated with the user's virtual presence at the location-of-interest.

At task 1104, terminal 102 plays the audio recording to the user. In the illustrative embodiment, the audio recording received by terminal 102 is created by the user who subscribed to "Continuous Services." In other embodiments, the audio recording is created by other users that are authorized to create the audio recording.

It will be clear to those skilled in the art, after reading this specification, how to make and use alternative embodiments of the present invention in which terminal 102 receives both a first audio recording and a second audio recording for the location-of-interest. In this alternative embodiment, the first audio recording is created by the user who subscribed to "Continuous services," while the second audio recording created by an authorized user.

At task 1106, terminal 102 determines if the user has unmarked his virtual presence at the location-of-interest on map 702 to unsubscribe to "Continuous Services."

At task 1108, if terminal 102 determines that the user did not unsubscribe to "Continuous Services," the illustrative embodiment returns to task 1102, where terminal 102 continues to periodically receive the same audio recording from data-processing system 106 at a later time (e.g., fifteen minutes later, one hour later, one day later, etc.). On the other hand, if terminal 102 determines that the user unsubscribed to "Continuous Services," the illustrative embodiment ends and terminal 102 does not receive any audio recordings associated with the user's virtual presence at the location-of-interest.

Figure 12:
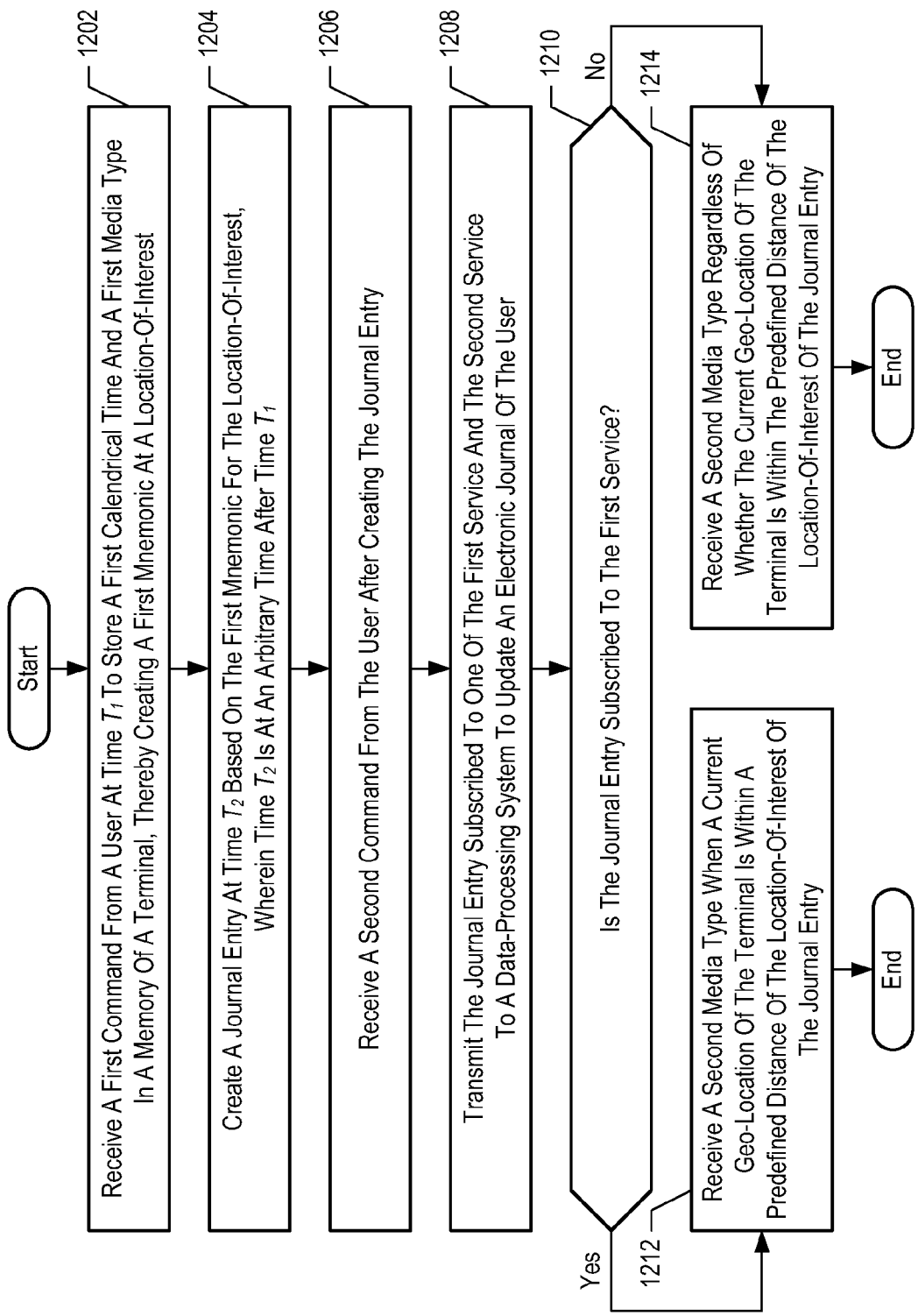
FIG. 12 depicts a flowchart of the operations in accordance with a second illustrative embodiment of the present invention.

FIG. 12 depicts a flowchart of the operations in accordance with a second illustrative embodiment of the present invention. FIG. 12 comprises: tasks 1202, 1204, 1206, 1208, 1210, 1212, and 1214. It will be clear to those skilled in the art, after reading this specification, how to make and use alternative embodiments of the present invention in which task 1202 through task 1214 can be performed concurrently, simultaneously, at different times, or in a different order.

At task 1202, a user of telecommunications terminal 102 arrives at a first location-of-interest. While physically at this location, the user executes application software 204 on terminal 102. In response to executing the application software, terminal 102 displays a soft-button labeled "pin," for example, to the user on display 210. At time $T_1$, and while physically at the first location-of-interest, the user invokes the "pin" button by performing, for example, and without limitation, a single tap or swipe of the button. This single tap or swipe of the button represents a first command for terminal 102 to store a first calendrical time and a first media type in memory 202, thereby creating a first mnemonic for the first location-of-interest. The tasks performed by terminal 102 in response to receiving the first command at time $T_1$ will be described in more detail below, with reference to FIG. 13. In will be clear to those skilled in the art, after reading this specification, how to make and use the present invention in which the task of 1202 can be performed to create additional mnemonics (e.g., a second mnemonic for a second location-of-interest, etc.).

At task 1204, the user decides to create a journal entry for the first location-of-interest via application software 204 at time $T_2$, wherein time $T_2$ is at an arbitrary time after time $T_1$. It is notable that time $T_2$ can be, for example, and without limitation, one or more hours, days, weeks, or months after the first command at time $T_1$. To create the journal entry, the user executes application software 204 on terminal 102 to display a list of locations-of-interests that were "pinned" in the past. The list includes the first mnemonic, as well as other mnemonics created for other locations-of-interests.

As discussed in the beginning of this specification, each location-of-interest in the list is organized based on its respective geo-location. Each location-of-interest in the list is displayed with a mnemonic that comprises at least one of, or any combination of, calendrical time, audio recordings, photos, and videos. For example, the user can select an audio recording of a particular mnemonic in the list to play the audio that was recorded at that particular location-of-interest. Similarly, the user can select a photo of a particular mnemonic to view the image that was captured at that particular location-of-interest.

In this regard, the user can recall the details of the first location-of-interest by selecting, for example, the first media type associated with the first mnemonic from the list. If the first media type is an audio recording, terminal 102 retrieves the audio recording from memory 202 and plays the audio recording to the user. The audio recording can be, for example, and without limitation, the user's voice, another user's voice, background noise, etc. that was recorded at the first location-of-interest. The user can also select a photo associated with the first mnemonic from the list to further assist him in remembering the first location-of-interest. In response to the user's selection, terminal 102 retrieves the photo from memory 202 and displays it to the user.

Once the user recalls the details of the first location-of-interest, the user creates the journal entry in a new screen by providing, for example, and without limitation, text, an audio recording, a photo, a video, etc. As part of creating the journal entry, the user can also provide authorization information such that the journal entry can be viewed only by the user, or shared with friends or the public. The tasks of creating the journal entry will be described in more detail below, with reference to FIG. 14.

At task 1206, terminal 102 receives a second command from the user after creating the journal entry for the first location-of-interest. The second command provided by the user via application software 204 subscribes the first location-of-interest of the journal entry to a first service (i.e., "Return Services") or a second service (i.e., "Continuous Services"). Once the user has subscribed to one of these services, terminal 102 associates the subscription with the first location-of-interest and the journal entry and stores the association in memory 202. Task 1206 will be described in more detail below, with reference to FIG. 15.

At task 1208, terminal 102 transmits the journal entry along with all or some of the information obtained and/or created at tasks 1202 through 1206 to data-processing system 106 via telecommunications network 108. Data-processing system 106 receives the information and updates electronic journal of the user based at least in part on the journal entry.

At task 1210, terminal 102 determines whether the journal entry is subscribed to the first service. If the journal entry is subscribed to the first service, the present invention proceeds to task 1212, otherwise the present invention proceeds to task 1214.

At task 1212, if the user subscribed the first location-of-interest and the journal entry to the "Return Services," terminal 102 receives a second media type from data-processing system 106 based on a determination that terminal 102's current geo-location is within a predefined distance of the first location-of-interest of the journal entry. Task 1212 will be described in more detail below, with reference to FIG. 16 and FIG. 17.

On the other hand, if the user subscribed the first location-of-interest and the journal entry to the second service, terminal 102 receives the second media type from data-processing system 106 at task 1214 regardless of whether its current geo-location is within a predefined distance of the location-of-interest of the journal entry.

Figure 13:
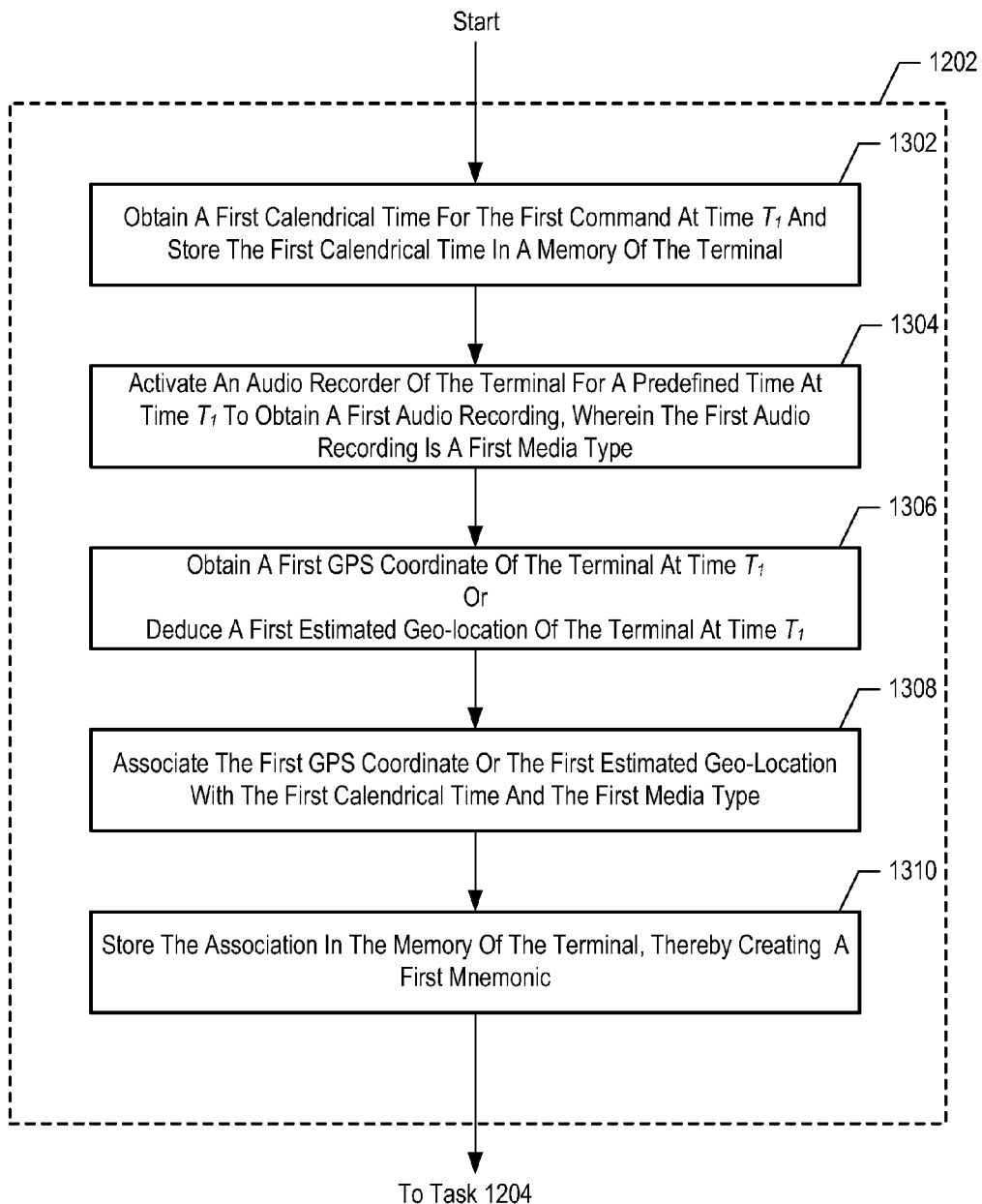
FIG. 13 depicts a flowchart of the operations of task 1202 for creating a mnemonic in accordance with a second illustrative embodiment of the present invention.

FIG. 13 depicts a flowchart of the operations of task 1202 for creating a mnemonic in accordance with a second illustrative embodiment of the present invention. FIG. 13 comprises: tasks 1302, 1304, 1306, 1308, and 1310. It will be clear to those skilled in the art, after reading this specification, how to make and use alternative embodiments of the present invention in which task 1302 through 1310 can be performed concurrently, simultaneously, at different times, or in a different order.

At task 1302, telecommunications terminal 102 obtains the calendrical time of the first command. The calendrical time represents the date and time of when the user invoked the "pin" button on display 210 at time $T_1$. In the illustrative embodiment, terminal 102 obtains the calendrical time of the first command by using its own digital clock to record the date and time of when the user invoked the "pin" button. Once obtained, terminal 102 stores the calendrical time in memory 202.

At task 1304, terminal 102 activates audio recorder 206 for a predefined time. Once activated, the user records a word, a phrase, a sentence, or background noise to help him remember the first location-of-interest at a later time. In the illustrative embodiment, the user records his voice, while in other embodiments, the user records, for example, and without limitation, another user's voice or background noise at the first location-of-interest. Furthermore, the predefined time of audio recorder 206 is five seconds in the illustrative embodiment, while in other embodiments, the predefined time is greater or less than five seconds (e.g., four seconds, ten seconds, fifteen seconds, etc.). Once created, terminal 102 stores the audio recording in memory 202 as a first media type.

At task 1306, terminal 102 transmits a request to a location-aware service to obtain a Global Positioning System (GPS) coordinate that is indicative of terminal 102's current geo-location at time $T_1$. Once obtained, terminal 102 stores the GPS coordinate in memory 202. However, if terminal 102 is unable to obtain the GPS coordinate from the location-aware service, terminal 102 automatically deduces an estimate of its current geo-location using a list of Service Set Identifiers (SSIDs) received by a nearby Wireless Local Area Network (WLAN) at the first location-of-interest. Once deduced, the estimated geo-location is stored in memory 202.

At task 1308, terminal 102 associates the GPS coordinate or the estimated geo-location with the first calendrical time and the first media type. At task 1310, terminal 102 stores the association in memory 202, thereby creating a first mnemonic for the first location-of-interest.

It will be clear to those skilled in the art, after reading this specification, how to make and use the present invention in which tasks 1302 through 1310 are also performed by terminal 102 to create additional mnemonics for other locations-of-interests.

Figure 14:
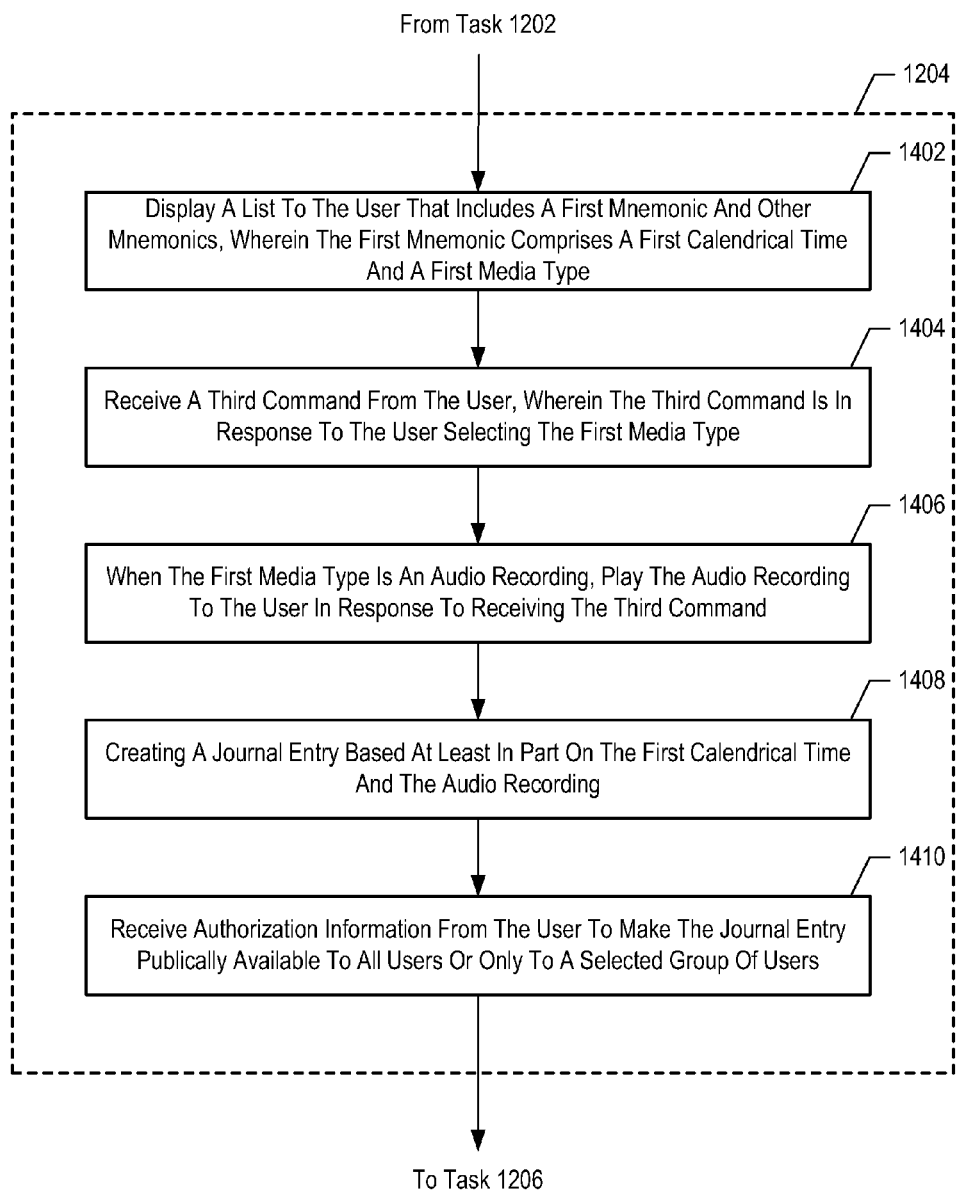
FIG. 14 depicts a flowchart of the operations of task 1204 for creating an electronic journal entry based on a mnemonic in accordance with a second illustrative embodiment of the present invention.

FIG. 14 depicts a flowchart of the operations of task 1204 for creating an electronic journal entry based on a mnemonic in accordance with a second illustrative embodiment of the present invention. FIG. 14 comprises: tasks 1402, 1404, 1406, 1408, and 1410. It will be clear to those skilled in the art, after reading this specification, how to make and use alternative embodiments of the present invention in which task 1402 through task 1410 can be performed concurrently, simultaneously, at different times, or in a different order.

At task 1402, the user executes application software 204 on terminal 102 and invokes a "list" button. In response, terminal 102 displays a list that includes the first mnemonic, as well as other mnemonics, to the user. The list is displayed with the first calendrical time and the first media type as the first mnemonic for the first location-of-interest.

At task 1404, terminal 102 receives a third command from the user via application software 204, wherein the third command is in response to the user selecting the first media type in the list. If the first media type is an audio recording that was recorded at the first location-of-interest, terminal 102 retrieves the audio recording from memory 202 and plays it to the user at task 1406. On the other hand, if the first media type is a photo that was captured at the first location-of-interest, terminal 102 retrieves one or more photos from memory 202 and presents them to the user.

At task 1408, the user recalls the details of the first location-of-interest based on the first mnemonic (i.e., after listening to the audio recording and/or viewing the photos) and launches a new screen on terminal 102 to create a journal entry. In this new screen, the user can include at least one of the following types of media to create the journal entry for the first location-of-interest:

(i) the calendrical time obtained by terminal 102 at task 1302;

(ii) the audio recording obtained by terminal 102 at task 1304;

(iii) the GPS coordinate or estimated geo-location obtained by terminal 102 at task 1306;

(iv) text provided by the user via terminal 102 that describes the first location-of-interest;

(v) one or more additional audio recordings stored in memory 202 that were recorded at the first location-of-interest;

(vi) one or more photos stored in memory 202 that were captured at the first location-of-interest;

(vii) one or more videos stored in memory 202 that were captured at the first location-of-interest; or (viii) any combinations of (i) through (vii) above.

It will be clear to those skilled in the art, after reading this specification, how to make and use alternative embodiments of the present invention in which terminal 102 retrieves the above media from a data-processing system via telecommunications network 108 to create the journal entry.

At task 1410, the user provides authorization information for the journal entry via application software 204. This authorization information provided by the user instructs data-processing system 106 to either make the journal entry private or public. In other words, if the authorization information is to make the journal entry private, only the user can view the journal entry. On the other hand, if the authorization information is to make the journal entry public, the user can choose a selected group of users (e.g., family, co-workers, friends, etc.) from a "buddy list," or allow all users in the public domain to view the journal entry. Once the user has created the journal entry and provided the authorization information, the illustrative embodiment proceeds to task 1206 for subscribing to the first service or the second service.

Figure 15:
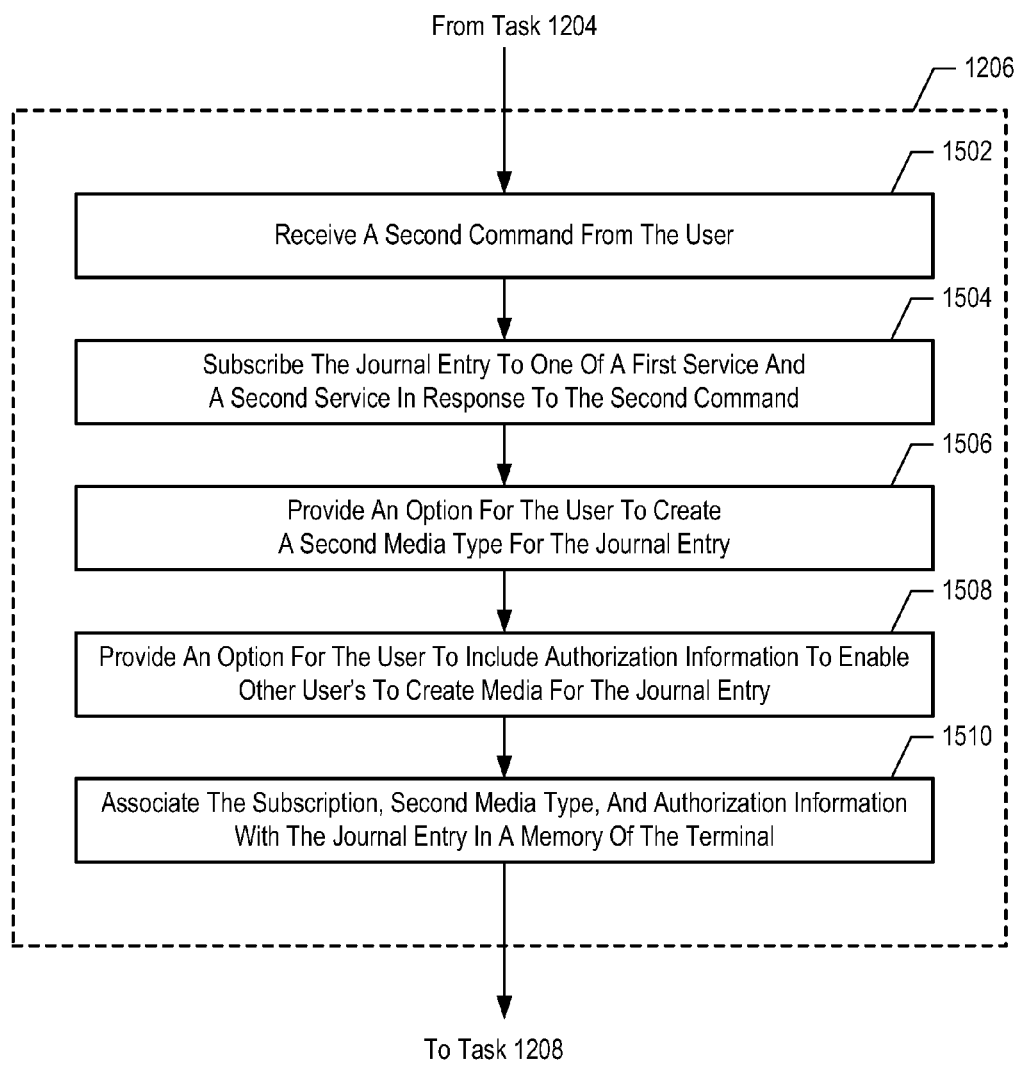
FIG. 15 depicts a flowchart of the operations of task 1206 for subscribing a journal entry for a location-of-interest to a first service or a second service in accordance with a second illustrative embodiment of the present invention.

FIG. 15 depicts a flowchart of the operations of task 1206 for subscribing a journal entry for a location-of-interest to a first service or a second service in accordance with a second illustrative embodiment of the present invention. FIG. 15 comprises: tasks 1502, 1504, 1506, 1508, and 1510. It will be clear to those skilled in the art, after reading this specification, how to make and use alternative embodiments of the present invention in which task 1502 through task 1510 can be performed concurrently, simultaneously, at different times, or in a different order. For the purpose of describing FIG. 15, the first service will be called "Return Services" and the second service will be called "Continuous Services."

At task 1502, terminal 102 receives a second command from the user via application software 204, wherein the second command is received by terminal 102 after the user created the journal entry for the first location-of-interest.

At task 1504, terminal 102 subscribes the first location-of-interest and the journal entry to "Return Services" or "Continuous Services" in response to receiving the second command. Once the user has subscribed the first location-of-interest and the journal entry to one of these services, the subscription is stored in memory 202 of terminal 102.

At task 1506, terminal 102 provides an option for the user to create a second media type for the first location-of-interest. This second media type serves as a reminder for the user to, for example, perform certain tasks when he returns to or near the first location-of-interest in the near or distant future. If the user chooses to create the second media type, the user can speak into audio recorder 206 to record a word, phrase, sentence, etc. Once created, terminal 102 stores the audio recording in memory 202 and the illustrative embodiment proceeds to task 1508. Alternatively, the user can choose not to create the second media type by invoking a soft-button of terminal 102. In either case, the illustrative embodiment proceeds to task 1510 after the user is given the opportunity to create the second media type.

Although the first media type created at task 1304 and the second media type created at task 1506 are both reminders, they differ in that one is used to remind the user of the past, while the other is used to remind the user of the future. In other words, the first media type is used to help the user recall details of past locations-of-interests, while the second media type is used to remind the user of tasks that need to be accomplished in the near or distant future.

At task 1508, terminal 102 provides an option for the user to include authorization information for the first location-of-interest. The authorization information enables other users to create media for the first location-of-interest of the journal entry. If the user who subscribed to the service chooses to allow, for example, his friends, family members, co-workers, etc., to create an audio recording, the user can select the authorized users by bring up a "buddy list." Once selected, terminal 102 stores the authorization information in memory 202, and the illustrative embodiment proceeds to task 810. Alternatively, the user can choose not to allow other users to create an audio recording, in which case, the illustrative embodiment proceeds to task 810.

At task 1510, terminal 102 associates the subscription with the journal entry and stores the association in memory 202. If an audio recording was created by the user at task 1506, or if authorization information was provided by the user at task 1508, terminal 102 likewise associates this information with the first location-of-interest and the journal entry in memory 202.

Figure 16:
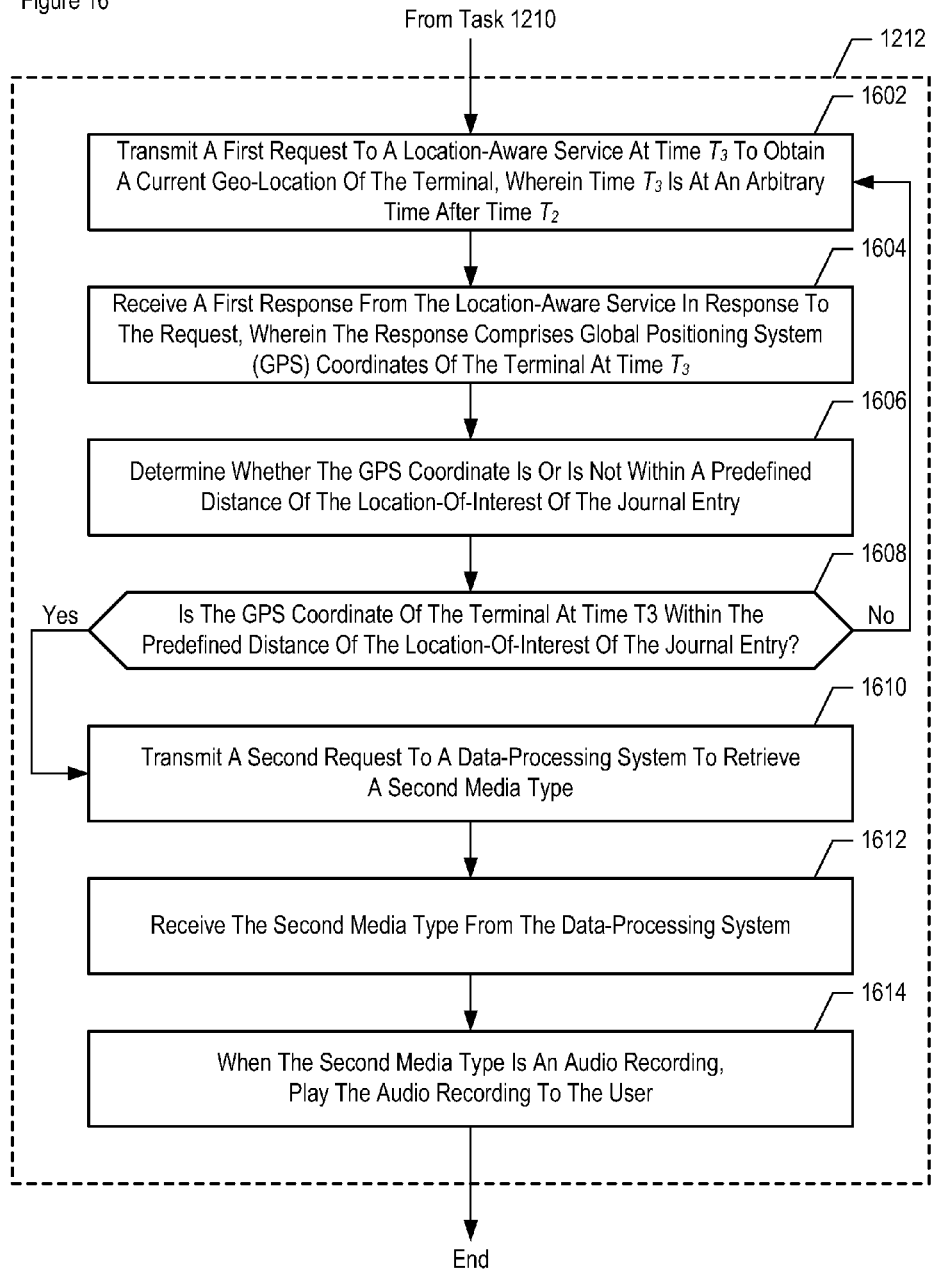
FIG. 16 depicts a flowchart of the operations of task 1212 for initiating the first service by a terminal in accordance with a second illustrative embodiment of the present invention.

FIG. 16 depicts a flowchart of the operations of task 1212 for initiating the first service by a terminal in accordance with a second illustrative embodiment of the present invention. FIG. 16 comprises: tasks 1602, 1604, 1606, 1608, and 1610. It will be clear to those skilled in the art, after reading this specification, how to make and use alternative embodiments of the present invention in which task 1602 through task 1610 can be performed concurrently, simultaneously, at different times, or in a different order.

For the purpose of describing FIG. 16, the first service will be called "Return Services" and the second service will be called "Continuous Services." In order to initiate one of these services, terminal 102 needs to determine whether the first location-of-interest is subscribed to "Return Services" or "Continuous Services" at task 1210. Since the subscription for the first location-of-interest is stored in memory 202 at task 1504, terminal 102 can retrieve the subscription from memory 202, analyze it, and determine that the journal entry is subscribed to "Return Services." Based on this determination, terminal 102 initiates "Return Services," as described below.

At task 1602, terminal 102 transmits a first request to a location-aware service at time $T_3$ to obtain its current geo-location, wherein time $T_3$ is at an arbitrary time after time $T_2$. It is notable that time $T_3$ can be, for example, and without limitation, one or more hours, days, weeks, or months after the first command at time $T_2$.

At task 1604, terminal 102 receives a first response from the location-aware service, wherein the first response includes Global Positioning System (GPS) coordinates of terminal 102 at time $T_3$.

At task 1606, terminal 102 determines whether the GPS coordinates are within a predefined distance of the first location-of-interest of the journal entry. That is, terminal 102 compares the GPS coordinates obtained at task 1606 with the GPS coordinates or estimated geo-location obtained at task 1306.

At task 1608, if the GPS coordinate is determined by terminal 102 to be within a predefined distance of the first location-of-interest, the illustrative embodiment proceeds to task 1610 to retrieve the second media type from data-processing system 106. For example, and without limitation, if terminal 102 determines that the GPS coordinates obtained at task 1604 is within one hundred yards of the GPS coordinates or estimated geo-location obtained at task 1306, the illustrative embodiment proceeds to task 1610 to retrieve the audio recording from data-processing system 106. The predefined distance can be pre-programmed into application software 204 or defined by the user via terminal 102.

On the other hand, if the GPS coordinate of terminal 102 is determined not to be within the predefined distance of the first location-of-interest, the illustrative embodiment returns to task 1602. For example, if terminal 102 determines that that the GPS coordinates obtained at task 1604 is not within one hundred yards of the GPS coordinates or estimated geo-location obtained at task 1306, the illustrative embodiment loops back and repeats task 1602 through 1608 fifteen minutes later. The time in which terminal 102 repeats tasks 1602 through 1608 can be pre-programmed into application software 204 or defined by the user via terminal 102.

At task 1610, terminal 102 transmits a second request to data-processing system 106 via telecommunications network 108 to retrieve the second media type.

At task 1612, terminal 102 receives the second media type from data-processing system 106 in response the second request. In the illustrative embodiment, the second media type is an audio recording created by the user who subscribed to "Return Services." In other embodiments, the second media type is an audio recording created by authorized users, as described above with reference to FIG. 15.

It will be clear to those skilled in the art, after reading this specification, how to make and use alternative embodiments of the present invention in which terminal 102 receives both a first audio recording and a second audio recording for the first location-of-interest. In this alternative embodiment, the first audio recording is created by the user who subscribed to "Return services," while the second audio recording created by an authorized user, as described above with reference to FIG. 15.

At task 1214, terminal 102 plays the audio recording to the user via audio recorder 206.

Figure 17:
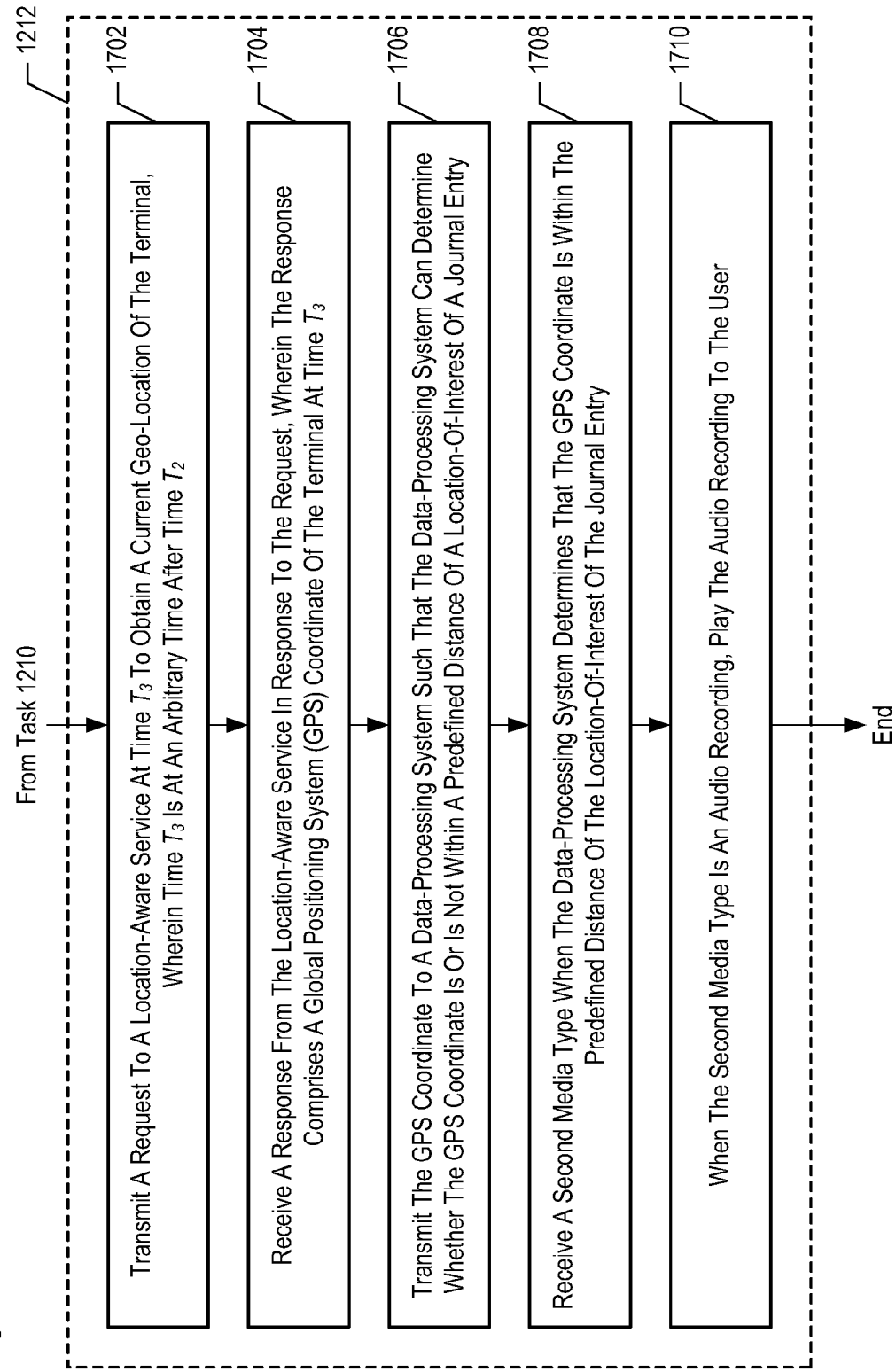
FIG. 17 depicts a flowchart of the operations of task 1212 for initiating the first service by a data-processing system in accordance with a second illustrative embodiment of the present invention.

FIG. 17 depicts a flowchart of the operations of task 1212 for initiating the first service by a data-processing system in accordance with a second illustrative embodiment of the present invention. FIG. 17 comprises: tasks 1702, 1704, 1706, 1708, and 1710. It will be clear to those skilled in the art, after reading this specification, how to make and use alternative embodiments of the present invention in which task 1702 through task 1710 can be performed concurrently, simultaneously, at different times, or in a different order.

For the purpose of describing FIG. 17, the first service will be called "Return Services" and the second service will be called "Continuous Services." In this alternative embodiment of the present invention, it is data-processing system 106 that initiates "Return Services," rather than terminal 102.

At task 1702, terminal 102 transmits a request to a location-aware service at time $T_3$ to obtain its current geo-location, wherein time $T_3$ is at an arbitrary time after time $T_2$. It is notable that time $T_3$ can be, for example, and without limitation, one or more hours, days, weeks, or months after the first command at time $T_2$.

At task 1704, terminal 102 receives a response from the location-aware service, wherein the response includes Global Positioning System (GPS) coordinates of terminal 102 at time $T_3$.

At task 1706, terminal 102 transmits the GPS coordinates received at task 1704 to data-processing 106. Once data-processing system 106 receives the GPS coordinates, the data-processing system determines whether the GPS coordinates are within a predefined distance of the first location-of-interest of the journal entry.

At task 1708, terminal 102 receives the second media type as a result from data-processing system 106 determining that the GPS coordinates is within the predefined distance. In this embodiment, the second media type is an audio recording similar to the one described above, with respect to FIG. 16.

At task 1710, terminal 102 plays the audio recording to the user via audio recorder 206.

Figure 18:
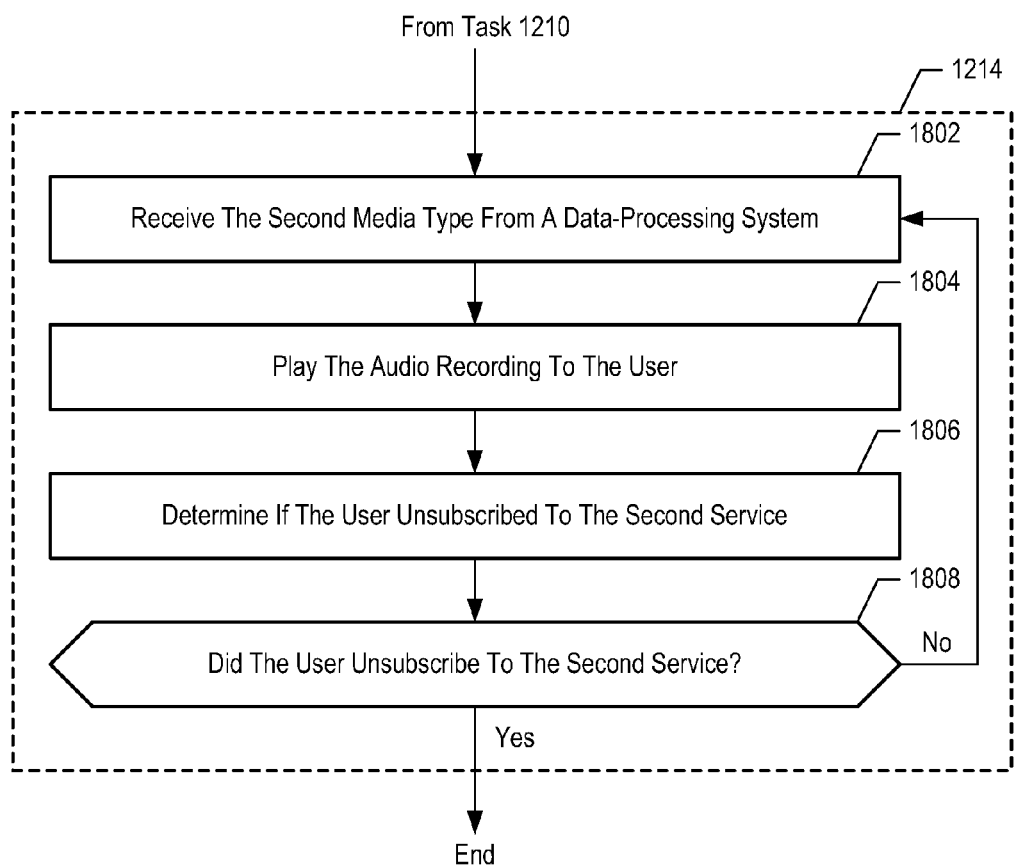
FIG. 18 depicts a flowchart of the operations of task 1214 for initiating the second service in accordance with a second illustrative embodiment of the present invention.

FIG. 18 depicts a flowchart of the operations of task 1214 for initiating the second service in accordance with a second illustrative embodiment of the present invention. FIG. 18 comprises: tasks 1802, 1804, 1806, and 1808. It will be clear to those skilled in the art, after reading this specification, how to make and use alternative embodiments of the present invention in which task 1802 through task 1810 can be performed concurrently, simultaneously, at different times, or in a different order.

For the purpose of describing FIG. 11, the first service will be called "Return Services" and the second service will be called "Continuous Services." The flowchart of FIG. 18 corresponds to the user subscribing the first location-of-interest and the journal entry to "Continuous Services."

In order to initiate this service, data-processing system 106 needs to determine whether the journal entry for the first location-of-interest is subscribed to "Return Services" or "Continuous Services." Since the subscription was transmitted by terminal 102 to data-processing system 106 at task 1208, the data-processing system can retrieve the information from memory 302, analyze it, and determine that the first location-of-interest of the journal entry is subscribed to "Continuous Services." Based on this determination, data-processing system 106 initiates "Continuous Services," as described below.

At task 1802, data-processing system 106 transmits, and terminal 102 receives, the second media type via telecommunications network 108. In the illustrative embodiment, the second media type is an audio recording.

At task 1804, terminal 102 plays the audio recording to the user. In the illustrative embodiment, the audio recording received by terminal 102 is created by the user who subscribed to "Continuous Services." In other embodiments, the audio recording is created by other users that are authorized to create the audio recording, as described above with reference to FIG. 15.

At task 1806, terminal 102 determines if the user has unsubscribe to "Continuous Services." At task 1108, if terminal 102 determines that the user did not unsubscribe to "Continuous Services," the illustrative embodiment returns to task 1802, where terminal 102 receives the same audio recording from data-processing system 106 at a later time (e.g., fifteen minutes later, one hour later, one day later, etc.). On the other hand, if terminal 102 determines that the user unsubscribed to "Continuous Services," the illustrative embodiment ends and terminal 102 does not receive any audio recordings associated with the user's virtual presence.

What is claimed is:

1. A method comprising:

receiving, by a terminal, a first command from a first user at time $T_1$, wherein the first command stores a first calendrical time and a first media type in a memory of the terminal, thereby creating a first mnemonic for a location-of-interest;

creating, by the terminal, a journal entry for the location-of-interest at time $T_2$, wherein the journal entry is created based on the first mnemonic, and wherein time $T_2$ is at an arbitrary time after time $T_1$;

receiving, by the terminal, a second command from the first user, wherein the second command subscribes the location-of-interest of the journal entry to one of a first service and a second service;

transmitting, by the terminal, the journal entry to a data-processing system, wherein the data-processing system updates an electronic journal based on the journal entry;

receiving, by the terminal, when the subscription is to the first service, a second media type from the data-processing system when a current geo-location of the terminal is within a predefined distance of the location-of-interest of the journal entry; and receiving, by the terminal, when the subscription is to the second service, the second media type from the data-processing system regardless of whether the current geo-location is or is not within the predefined distance of the location-of-interest of the journal entry;

wherein the second media type is created by a second user in response to being notified by the data-processing system that:
(i) the first user has updated the electronic journal, and
(ii) the first user has authorized the second user to create the second media type for the location-of-interest;
wherein the second media type is a reminder for the first user to complete a task at the location-of-interest;
wherein the first command at time $T_1$ is in response to the first user marking the location-of-interest on a map displayed by the terminal; and
wherein marking the map establishes a persistent, virtual presence of the first user at the location-of-interest such that the terminal automatically and periodically receives the second media type from the data-processing system when the location-of-interest is subscribed to the second service.

2. The method of claim 1, wherein the first media type is an audio recording that was recorded by the first user at time $T_1$, and wherein creating the journal entry based on the first mnemonic at time $T_2$ comprises:
displaying, by the terminal, a list to the first user that includes the first mnemonic and the audio recording;
receiving, by the terminal, a third command from the first user;
playing, by the terminal, the audio recording to the first user in response to receiving the third command; and
creating, by the terminal, the journal entry based at least in part on the audio recording.

3. The method of claim 1, wherein the journal entry is created with authorization information at time $T_2$, and wherein the authorization information instructs the data-processing system to make the journal entry either publicly available to all users or only to a selected group of users.

4. The method of claim 1, wherein receiving the second media type, when the subscription is to the first service, comprises the following tasks:
(i) transmitting, by the terminal, a request to a location-aware service at time $T_3$ to obtain the current geo-location of the terminal, wherein time $T_3$ is at an arbitrary time after time $T_2$;
(ii) receiving, by the terminal, a response from the location-aware service, wherein the response comprises a Global Positioning System (GPS) coordinate of the terminal at time $T_3$;
(iii) transmitting, by the terminal, the GPS coordinate to the data-processing system, wherein the data-processing system determines whether the GPS coordinate is or is not within the predefined distance of the location-of-interest of the journal entry; and
(iv) receiving, by the terminal, the second media type from the data-processing system when the data-processing system determines that the GPS coordinate is within the predefined distance of the location-of-interest of the journal entry.

5. The method of claim 1, wherein receiving the second media type, when the subscription is to the first service, comprises the following tasks:
(i) transmitting, by the terminal, a first request to a location-aware service at time $T_3$ to obtain the current geo-location of the terminal, wherein time $T_3$ is at an arbitrary time after time $T_2$;
(ii) receiving, by the terminal, a first response from the location-aware service, wherein the first response comprises a Global Positioning System (GPS) coordinate of the terminal at time $T_3$;
(iii) determining, by the terminal, whether the GPS coordinate is or is not within the predefined distance of the location-of-interest of the journal entry; and
(iv) transmitting, by the terminal, a second request to the data-processing system to retrieve the second media type when the terminal determines that the GPS coordinate is within the predefined distance of the location-of-interest of the journal entry.

6. The method of claim 1, wherein the current geo-location of the terminal is periodically transmitted to the data-processing system when the second command subscribes to the first service; and
wherein the terminal receives the second media type from the data-processing system when the current geo-location is determined by the data-processing to be within the predefined distance of the location-of-interest.

* * * * *